US008913164B2

(12) United States Patent
Sekine

(10) Patent No.: US 8,913,164 B2
(45) Date of Patent: Dec. 16, 2014

(54) IMAGE PROCESSOR, ELECTRONIC DEVICE INCLUDING IMAGE PROCESSOR, AND IMAGE PROCESSING METHOD FOR PERFORMING STEPPED TONE CORRECTION ON IMAGES

(75) Inventor: Nobuaki Sekine, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 670 days.

(21) Appl. No.: 13/197,403

(22) Filed: Aug. 3, 2011

(65) Prior Publication Data
US 2012/0098988 A1 Apr. 26, 2012

(30) Foreign Application Priority Data

Oct. 22, 2010 (JP) ................................ 2010-237485

(51) Int. Cl.
H04N 5/202 (2006.01)
H04N 5/20 (2006.01)
H04N 5/235 (2006.01)

(52) U.S. Cl.
CPC . *H04N 5/20* (2013.01); *H04N 5/235* (2013.01)
USPC ......................................... 348/254; 382/274

(58) Field of Classification Search
CPC ............................... H04N 5/355; H04N 5/351
USPC .......... 348/222.1, 254, 228.1, 229.1; 382/274
See application file for complete search history.

(56) References Cited

U.S. PATENT DOCUMENTS

| 5,517,333 A | 5/1996 | Tamura et al. |
| 6,101,271 A * | 8/2000 | Yamashita et al. ............. 382/167 |
| 2007/0132858 A1* | 6/2007 | Chiba et al. ................. 348/222.1 |
| 2009/0225201 A1* | 9/2009 | Abe et al. ....................... 348/241 |

FOREIGN PATENT DOCUMENTS

| JP | 06-253176 A | 9/1995 |
| JP | 2007-235954 A | 9/2007 |
| JP | 2009-118012 A | 5/2009 |
| JP | 2009-212960 A | 9/2009 |

OTHER PUBLICATIONS

Japanese Office Action; Japanese Patent Application No. 2010-237485 dated Jan. 21, 2014.

* cited by examiner

*Primary Examiner* — Nelson D. Hernández Hernández
(74) *Attorney, Agent, or Firm* — Arent Fox LLP

(57) ABSTRACT

An image processor includes a first correction circuit that outputs a first correction value, which corresponds to a pixel value of an input image, based on a first correction characteristic. A second correction circuit outputs a second correction value, which corresponds to the pixel value of the input image, based on a second correction characteristic. A control circuit controls a ratio for mixing the first correction value and the second correction value. A mixing circuit that mixes the first correction value and the second correction value based on the ratio. A corrected pixel value, which corresponds to the pixel value of the input image, is generated in accordance with an output value of the mixing circuit.

9 Claims, 16 Drawing Sheets

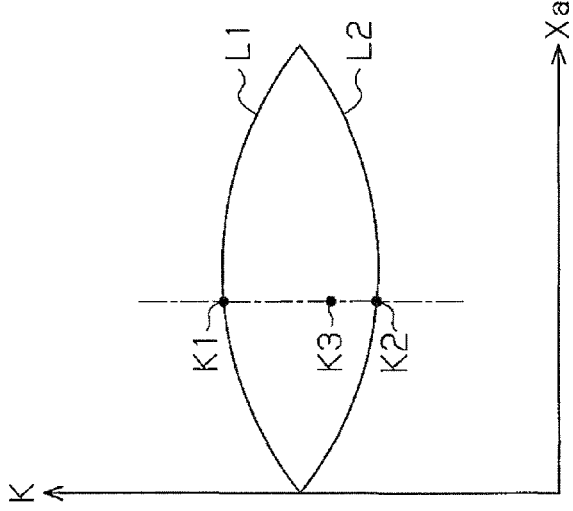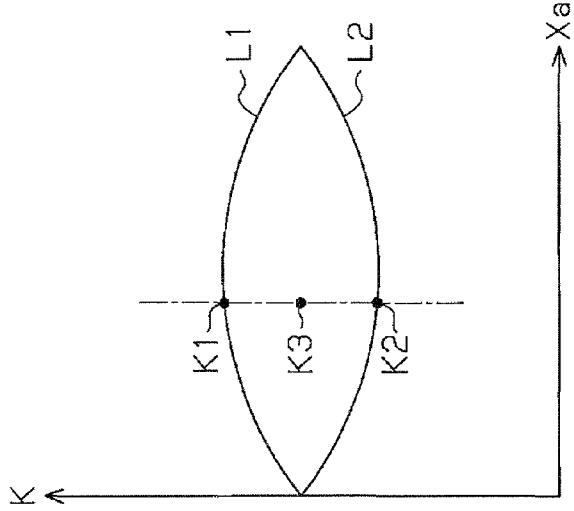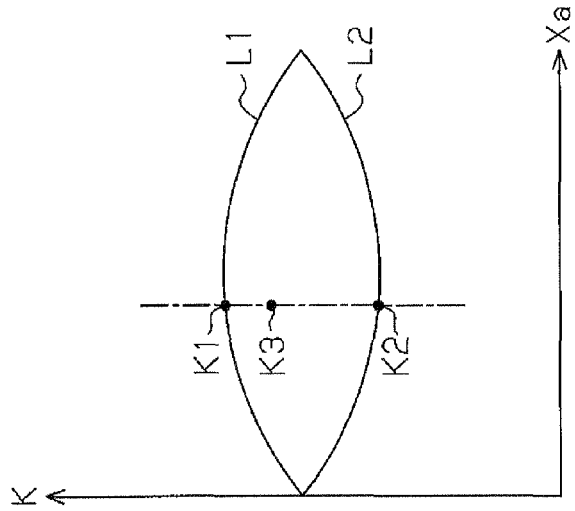

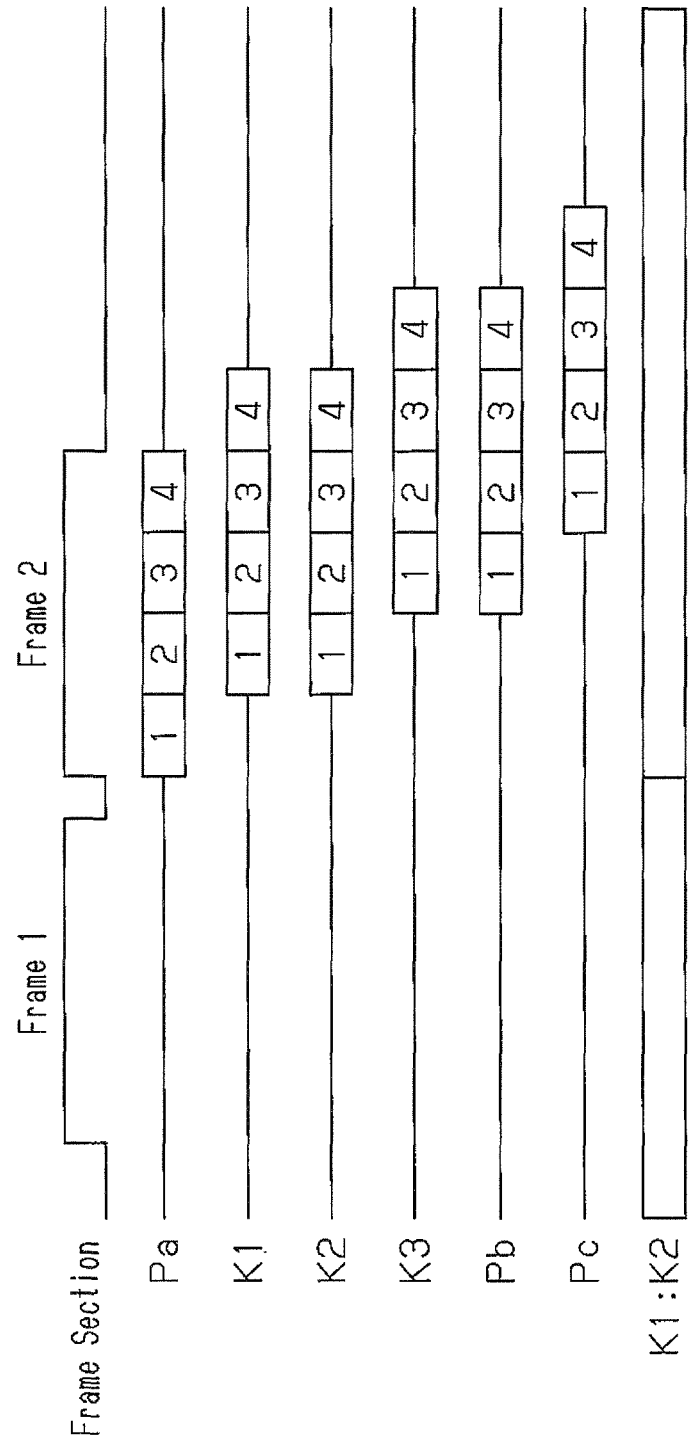

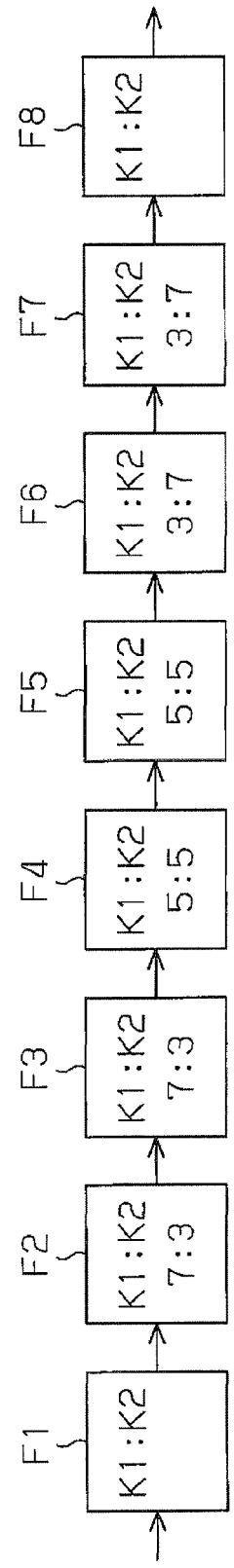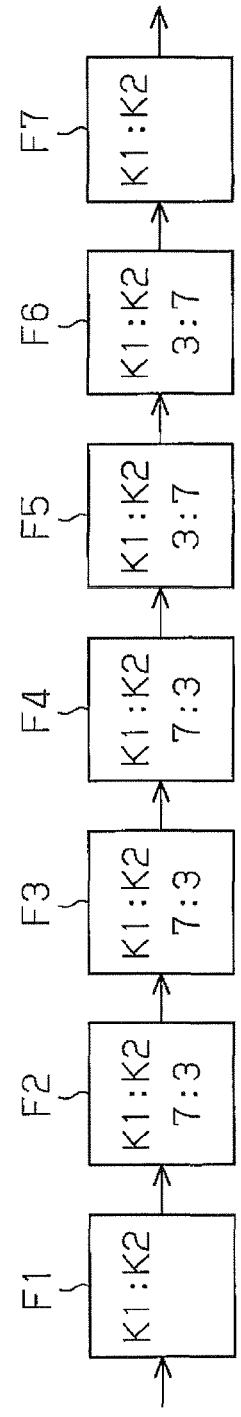

Fig.12A PT1

| Stage m | K1:K2 | Frame Number n |
|---|---|---|
| 1 | 8:2 | 2 |
| 2 | 6:4 | 3 |
| 3 | 4:6 | 3 |
| 4 | 2:8 | 2 |

Fig.12B PT2

| Stage m | K1:K2 | Frame Number n |
|---|---|---|
| 1 | 7:3 | 1 |
| 2 | 5:5 | 2 |
| 3 | 3:7 | 1 |

Fig.12C PT3

| Stage m | K1:K2 | Frame Number n |
|---|---|---|
| 1 | 7:3 | 2 |
| 2 | 3:7 | 1 |

Fig.12D PT4

| Stage m | K1:K2 | Frame Number n |
|---|---|---|
| 1 | 5:5 | 2 |

IMAGE PROCESSOR, ELECTRONIC DEVICE INCLUDING IMAGE PROCESSOR, AND IMAGE PROCESSING METHOD FOR PERFORMING STEPPED TONE CORRECTION ON IMAGES

CROSS-REFERENCE TO RELATED APPLICATIONS

This application is based upon and claims the benefit of priority from prior Japanese Patent Application No. 2010-237485, filed on Oct. 22, 2010, the entire contents of which are incorporated herein by reference.

FIELD

The present embodiment relates to an image processor, an electronic device including an image processor, and an image processing method.

BACKGROUND

Conventionally, an imaging device such as a digital camera has had a function for performing tone correction on data of a captured image by using a correction curve. Japanese Patent Laid-Open Publication No. 2009-212960 describes a conventional tone correction technology. For example, if an image is taken against the lights, the portrait of a person located at the center of the image may appear dark. In such a case, a correction curve, which may be selected from a plurality of correction curves, may be used to perform tone correction and generate image data that obtains a better image. Such a correction curve is stored in a correction table. Some of the correction curves are to correct and brighten a dark image, and other ones are to reduce the luminance of a bright image. The correction curves are switched by switching correction tables or rewriting correction data in a correction table.

When the correction curve is switched or rewritten, a sudden change occurs between consecutive images. For example, if the external brightness or photographing position changes frequently when consecutively capturing still images or a moving image with an electronic device, the luminance of the incoming images changes frequently. Here, if the external brightness further changes when the switching of correction curve ends, the correction curve will be switched again. As a result, an image repetitively becomes bright and dark a number of times. That is, flickering of the image occurs.

SUMMARY

According to one aspect, an image processor includes a first correction circuit that outputs a first correction value, which corresponds to a pixel value of an input image, based on a first correction characteristic. A second correction circuit outputs a second correction value, which corresponds to the pixel value of the input image, based on a second correction characteristic. A control circuit controls a ratio for mixing the first correction value and the second correction value. A mixing circuit mixes the first correction value and the second correction value based on the ratio. A corrected pixel value, which corresponds to the pixel value of the input image, is generated in accordance with an output value of the mixing circuit.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

The embodiments, together with objects and advantages thereof, may best be understood by reference to the following description of the presently preferred embodiments together with the accompanying drawings in which:

FIGS. 4A to 4C are explanatory graphs of a blend ratio for correction efficient values;

FIG. 5 is a timing chart illustrating operations of the tone control circuit;

FIGS. 6A and 6B are explanatory diagrams of tone correction;

FIGS. 12A to 12D are explanatory tables of a parameter table;

DESCRIPTION OF EMBODIMENTS

One embodiment of an image processor will now be described with reference to the drawings.

[System Configuration]

Figure 1:
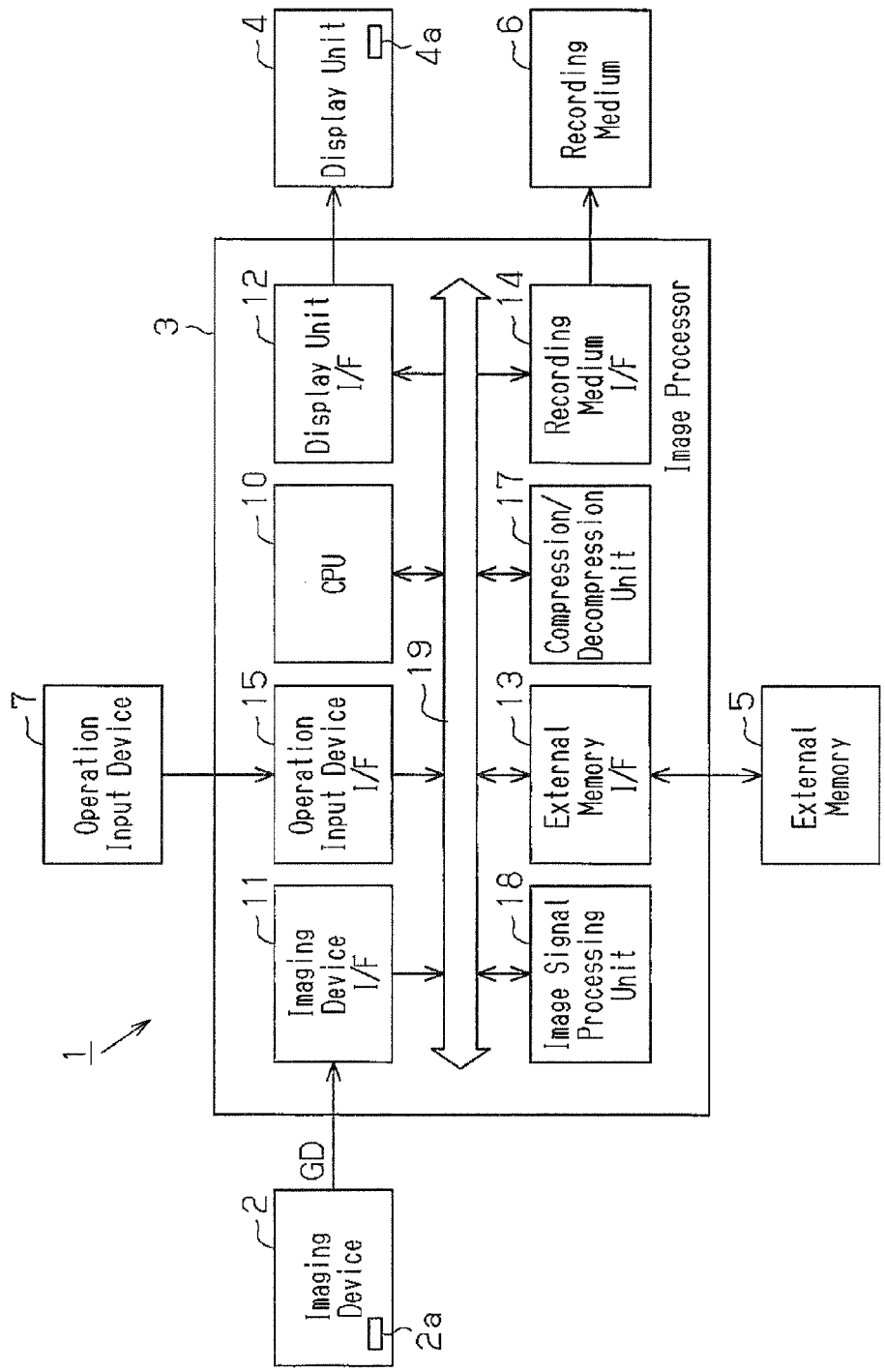
FIG. 1 is a block circuit diagram of an electronic device.

An electronic device 1 illustrated in FIG. 1 may be, for example, a cellular phone, which includes imaging functions, a digital camera, or a video camera.

The electronic device 1 includes an imaging device 2, an image processor 3, a display unit 4, an external memory 5, a recording medium 6, and an operation input device 7. The imaging device 2 may be, for example, a CMOS sensor module or a CCD image sensor module. The display unit 4 may be, for example, a liquid crystal display (LCD) or an organic EL display. The external memory 5 may be, for example, a synchronous dynamic random access memory (SDRAM) capable of storing image data of a plurality of frames. The recording medium 6 may be, for example, a portable recording medium such as a memory card, a USB memory, or a DVD. The operation input device 7 may be, for example, an operation switch, a volume switch, a dial switch, or a touch panel.

The imaging device 2 includes an imaging element 2a. The imaging element 2a outputs an imaging signal (analog signal) in response to incident light. The imaging device 2 converts the analog signal output from the imaging element 2a into a digital signal. The digital signal output from the imaging device 2 image data corresponding to a single screen captured by the imaging element 2a. An image corresponding to a single screen refers to a single frame of an image.

The image processor 3 receives image data GD from the imaging device 2 and stores the image data GD in the external memory 5. The image processor 3 sets an operation mode such as an image capturing mode based on an input signal from the operation input device 7. The image processor 3 performs various kinds of image processing such as tone correction, gamma correction, and compression/decompression on the image data GD stored in the external memory 5. Then, the image processor 3 stores the processed image data GD in the external memory 5.

The image processor 3 outputs the processed image data GD to the display unit 4. The display unit 4 displays an image on a display 4a based on a frame of the image data GD output from the image processor 3. Further, the image processor 3 stores the image data GD read from the external memory 5 in the recording medium 6 based on an input signal from, for example, the operation input device 7.

The image processor 3 includes a central processing unit (CPU) 10, an imaging device interface 11, a display unit interface 12, an external memory interface 13, a recording medium interface 14, an operation input device interface 16, a compression/decompression unit 17, and an image signal processing unit 18. In FIG. 1, an interface is abbreviated as "I/F". In the following description also, "I/F" will be used.

The CPU 10, the I/Fs 11 to 15, the compression/decompression unit 17, and the image signal processing unit 18 are electrically connected to each other via a bus 19. The CPU 10 is a control circuit that centrally controls the I/Fs 11 to 15, the compression/decompression unit 17, and the image signal processing unit 18.

The CPU 10 operates in accordance with a program executed by the CPU 10. The CPU 10 receives an output signal of the operation input device 7 via the operation input device I/F 15. The CPU 10 outputs a control signal to the I/Fs 11 to 15, the compression/decompression unit 17, and the image signal processing unit 18 based on an output signal (for example, interruption signal) of each of the I/Fs 11 to 15, the compression/decompression unit 17, or the image signal processing unit 18. Further, the CPU 10 sets information corresponding to an operation state of the image processor 3 in the I/Fs 11 to 15, the compression/decompression unit 17, and the image signal processing unit 18 (their registers, for example).

For example, the CPU 10 displays a setting screen for setting various kinds of operation states in response to the output of the operation input device 7. Then, the CPU 10 generates a control signal for setting the image capturing mode (for still images or moving images), the type of correction, the execution of correction, photographing information, and the like in response to the output signal of the operation input device 7 when operated with the setting screen. Further, the CPU 10 outputs the control signal to the I/Fs 11 to 15 and the processing units 17 and 18 in response to the output signal of the operation input device 7 when operated with the setting screen.

For example, in response to the control signal, the imaging device I/F 11 outputs a command signal so that the imaging device 2 transfers the image data GD. Then, the imaging device I/F 11 receives the image data GD from the imaging device 2 and stores this image data GD in the external memory 5 via the external memory I/F 13. In response to the control signal, the display unit I/F 12 provides the display unit 4 with the image data GD read from the external memory 5 via the external memory I/F 13. In response to the control signal, the recording medium I/F 14 stores the image data GD read from the external memory 5 via the external memory I/F 13 in the recording medium 6.

Based on the control signal from the CPU 10, the compression/decompression unit 17 performs, for example, PEG-format compression on the image data read from the external memory 5 and stores the compressed data in the external memory 5. Further, based on the control signal from the CPU 10, the compression/decompression unit 17 performs decompression in accordance with a format that corresponds to the compression format on the data read from the external memory 5 and stores the decompressed data in the external memory 5.

The image signal processing unit 18 includes a plurality of processing units configured to process an image signal (image data). Based on the control signal from the CPU 10, the image signal processing unit 18 processes image data read from the external memory 5 via the external memory I/F 13 and stores the processed data in the external memory 5 via the external memory I/F 13. The plurality of processing units in the image signal processing unit 18 are, for example, a pre-processing unit, a color space conversion unit, and a resolution conversion unit. The preprocessing unit performs processing that rearranges data in a Bayer arrangement output from the imaging device 2. The preprocessing unit also performs white balance processing. The color space conversion unit converts data formats. For example, the color space conversion unit converts RGB-format image data into YCbCr-format image data. In the YCbCr format, the color of a pixel is expressed using luminance information (Y) and color differences (Cb, Cr). The resolution conversion unit performs processing to expand or reduce the image size (multiplied number of vertical and horizontal pixels) of image data.

Further, the image signal processing unit 18 includes a tone control circuit (for example, a circuit 20 illustrated in FIG. 2) configured to correct image data by using a tone curve. The tone curve is a characteristic curve that denotes characteristics of an output value corresponding to an input value and managed as table data or a calculation expression. The tone control circuit 20 performs tone correction that converts a value of given pixel information (for example, luminance information) of pixel data, which forms image data, into a value corresponding to a tone curve. For example, the tone control circuit 20 performs tone correction on image data read from the external memory 5 and stores the tone corrected image data in the external memory 5.

Various embodiments of the tone control circuit will now be described. Like or same reference numerals are given to those components that are the same or similar in all embodiments.

First Embodiment

Figure 2:
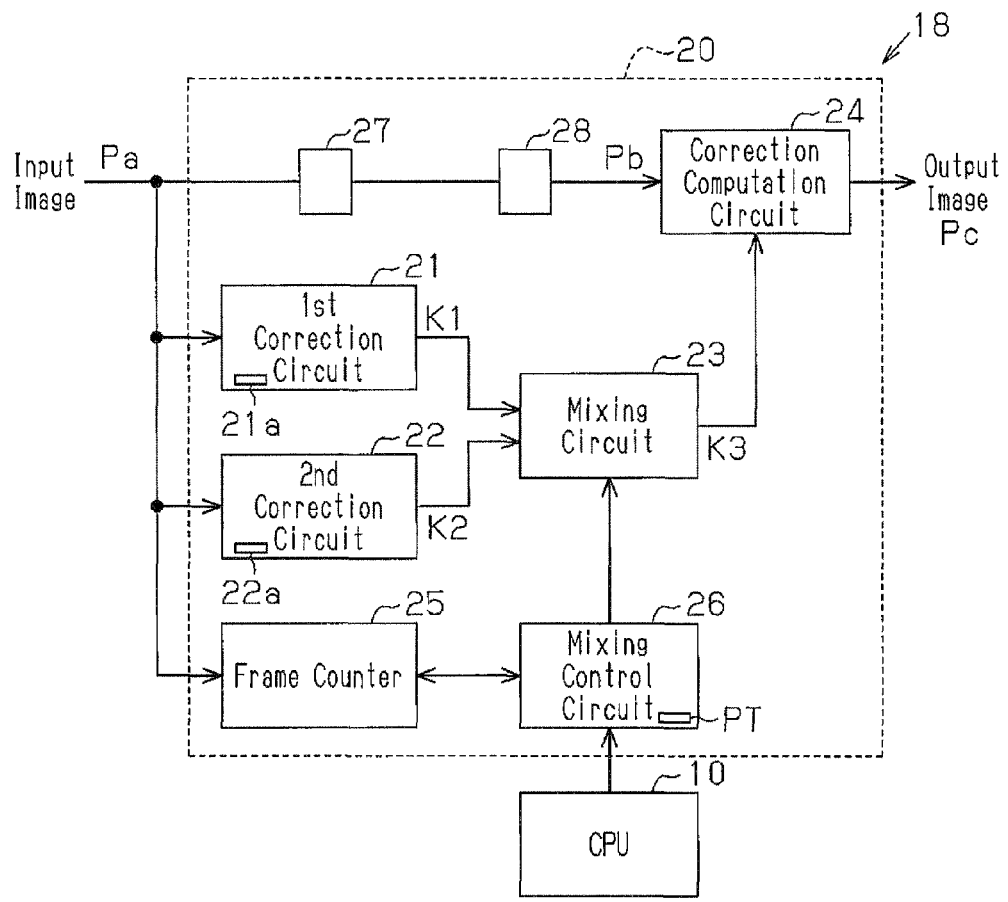
FIG. 2 is a block circuit diagram of a tone control circuit in a first embodiment.

As illustrated in FIG. 2, a tone control circuit 20 includes a first correction circuit 21, a second correction circuit 22, a mixing circuit 23, a correction computation circuit 24, a frame counter 25, a mixing control circuit 26, a first flip-flop circuit 27, and a second flip-flop circuit 28.

Pixel data Pa (input image) is provided to the first correction circuit 21, the second correction circuit 22, and the frame counter 25. The first correction circuit 21 includes a first correction table 21a. The first correction table 21a is prepared to obtain a first correction coefficient value K1 corresponding to a luminance value Xa of the pixel data Pa. The first correction table 21a is, for example, an RAM. The first correction table 21a stores a plurality of correction coefficient values corresponding to a correction coefficient curve having a given shape. The first correction circuit 21 reads the first correction coefficient value K1 corresponding to a luminance value Xa of the pixel data Pa from the first correction table 21a. The first correction coefficient value K1 is one example of a first correction value.

In the same manner as the first correction circuit 21, the second correction circuit 22 includes a second correction table 22a. The second correction table 22a is prepared to obtain a second correction coefficient value K2 corresponding to a luminance value Xa of the pixel data Pa. The second correction table 22a is, for example, a RAM. The second correction table 22a stores a plurality of correction coefficient values corresponding to a correction coefficient curve having a given shape. The second correction circuit 22 reads the second correction coefficient value K2 from the second correction table 22a corresponding to a luminance value Xa of the pixel data Pa. The second correction coefficient value K2 is one example of a second correction value.

The mixing circuit 23 receives the first correction coefficient value K1 and second correction coefficient value K2. Further, the mixing circuit 23 receives control signals from the mixing control circuit 26. The control signals include a control signal for obtaining a third correction coefficient value K3 with the mixing circuit 23 based on either the first correction coefficient value K1 or the second correction coefficient value K2. For example, the mixing circuit 23 functions to select either one of the first correction coefficient value K1 and the second correction coefficient value K2 in response to the control signal provided from the mixing control circuit 26. Then, the mixing circuit 23 generates the third correction coefficient value K3, which is equal to the selected correction coefficient value. The correction circuit providing the correction coefficient value that is not selected by the mixing circuit 23 stops accessing the pixel data Pa, that is, does not respond to the pixel data Pa. This enables, for example, the CPU 10 to change a value (correction data) in the correction table of the unselected correction circuit.

Further, the control signal provided from the mixing control circuit 26 includes a mixing ratio (blend ratio). The mixing circuit 23 calculates the third correction coefficient value K3 from the first correction coefficient value K1 and second correction coefficient value K2 based on the blend ratio. The blend ratio refers to a ratio between the first correction coefficient value K1 and the second correction coefficient value K2 when they are mixed. The mixing circuit 23 mixes (blends) the first correction coefficient value K1 and the second correction coefficient value K2 in accordance with the ratio. This generates the third correction coefficient value K3. For example, when the ratio of the first correction coefficient value K1 to the second correction coefficient value K2 is 7:3, the mixing circuit 23 calculates the third correction coefficient value K3 as follows:

$$K3=(K1\times 7/(7+3)+K2\times 3(7+3))$$

The pixel data Pa is provided to the first flip-flop circuit 27. An output signal of the first flip-flop circuit 27 is provided to the second flip-flop circuit 28, which in turn outputs pixel data Pb corresponding to the pixel data Pa. The pixel data Pb is provided to the correction computation circuit 24. That is, the correction computation circuit 24 receives the pixel data Pa via the first and second flip-flop circuits 27 and 28.

The correction computation circuit 24 receives the third correction coefficient value K3 from the mixing circuit 23. The correction computation circuit 24 calculates pixel data Pc (output image) based on the pixel data Pb and the third correction coefficient value K3. For example, the correction computation circuit 24 generates pixel data Pc by multiplying the pixel data Pb by the third correction coefficient value K3 and outputs the pixel data Pc.

The flip-flop circuits 27 and 28 are provided with a clock signal (not illustrated). The flip-flop circuits 27 and 28 each hold the level of an input signal in response to the clock signal and output a signal having the same level as the held signal level. Thus, the pixel data Pb supplied to the correction computation circuit 24 is delayed from the pixel data Pa by two cycles of the clock signal. The flip-flop circuits 27 and 28 form one example of a delay circuit.

The number of the flip-flop circuits 27 and 28 is set in accordance with the total value of the time required for the first and second correction circuits 21 and 22 to output the correction coefficient values K1 and K2 of the pixel data Pa and the time required by the mixing circuit 23 to mix the first and second correction coefficient values K1 and K2 and output the third correction coefficient value K3.

In one example, the delay time (latency) of the output data from the input data is set to "1" (one cycle of the clock signal) for the first correction circuit 21, the second correction circuits 22, and the mixing circuit 23. FIG. 5 is a timing chart illustrating operations of the tone control circuit 20. In this case, the processing performed on four pieces of pixel data Pa (referred to as "1" through "4") will now be described with reference to FIG. 5. In the description hereafter, a parenthesized numeral indicates a pixel number. For example, a first piece of pixel data is denoted as Pa(1).

In this case, as illustrated in FIG. 5, the first and second correction circuits 21 and 22 respectively output correction coefficient values K1(1) and K2(1) for pixel data Pa(1) one cycle after an input timing of the pixel data Pa(1). The mixing circuit 23 outputs a correction coefficient value K3(1) one cycle after an output timing of the correction coefficient values K1(1) and K2(1).

The flip-flop circuit 28 illustrated in FIG. 2 outputs pixel data Pb(1) two cycles after the input timing of the pixel data Pa(1). Thus, the correction computation circuit 24 is simultaneously provided with the pixel data Pb(1) and the correction coefficient value K3(1). Then, based on the pixel data Pb(1) and correction coefficient value K3(1), the correction computation circuit 24 calculates pixel data Pc(1). In this manner, the tone control circuit 20 corrects the pixel data Pa to the pixel data Pc by using the third correction coefficient value K3 corresponding to the pixel data Pa.

The correction coefficient values stored in the first correction table 21a differ from the correction coefficient values stored in the second correction table 22a. That is, the correction coefficient curve in the first correction circuit 21 differs from the correction coefficient curve in the second correction circuit 22 in shape (correction characteristic). The correction coefficient curve in each of the correction tables 21a and 22a corresponds to a tone curve that corrects a pixel value (for example, luminance value) of pixel data.

Figure 3A:
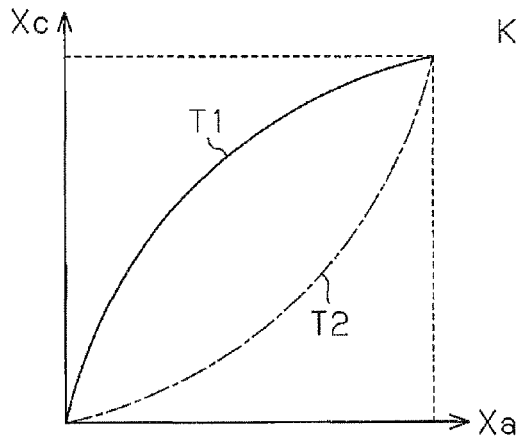
FIG. 3A is an explanatory graph of a tone curve.

A tone curve T1 illustrated by a solid line in FIG. 3A is used to generate an output image brightened from an input image. A tone curve T2 illustrated by a broken line in FIG. 3A is used to generate an output image darkened from the input image.

Figure 3B:
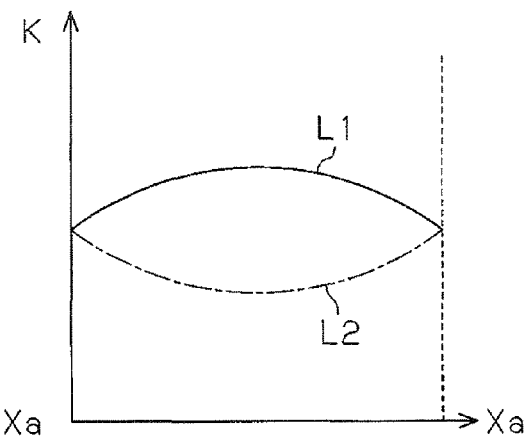
FIG. 3B is an explanatory graph of a correction coefficient curve.

The first correction table 21a stores a correction coefficient value corresponding to a correction coefficient curve L1 illustrated by a solid line in FIG. 3B. The shape of the correction coefficient curve L1, that is, the correction coefficient value, is set corresponding to the first tone curve T1 illustrated by the solid line in FIG. 3A. When the blend ratio of the correction coefficient values K1 and K2 is 10:0, the mixing circuit 23 outputs a correction coefficient value K3 equal to the correction coefficient value K1. In this case, the tone control circuit 20 calculates a luminance value Xc of the pixel data Pc from the luminance value Xa of the pixel data Pa and the correction coefficient value K3 (=K1) of the luminance value Xa obtained using the first correction coefficient curve L1. This luminance value Xc is equal to a luminance value obtained by correcting the luminance value Xa of the pixel data Pa with the tone curve T1.

In the same manner, the second correction table 22a stores a correction coefficient value corresponding to a correction coefficient curve L2 illustrated by the broken line in FIG. 3B. The shape of the correction coefficient curve L2, that is, a correction coefficient value, is set corresponding to the second tone curve T2 illustrated by the broken line in FIG. 3A. When the blend ratio of the correction coefficient values K1 and K2 is 0:10, the mixing circuit 23 outputs a correction coefficient value K3 equal to the correction coefficient value K2. In this case, the tone control circuit 20 calculates a luminance value Xc of the pixel data Pc from the luminance value Xa of the pixel data Pa and the correction coefficient value K3 (=K2) of the luminance value Xa obtained using the second correction coefficient curve L2. This luminance value Xc is equal to a luminance value obtained by correcting the luminance value Xa of the pixel data Pa with the tone curve T2.

In this manner, when the blend ratio of the correction coefficient values K1 and K2 is 10:0, the tone control circuit 20 obtains the luminance value Xc by correcting the luminance value Xa of the pixel data Pa in the same way as the tone correction performed by using the first tone curve T1 illustrated in FIG. 3A. Further, when the blend ratio of the correction coefficient values K1 and K2 is 0:10, the tone control circuit 20 obtains the luminance value Xc by correcting the luminance value Xa of the pixel data Pa in the same way as the tone correction performed by using the second tone curve T2 illustrated in FIG. 3A.

Further, the mixing circuit 23 in the tone control circuit 20 calculates the third correction coefficient value K3 by mixing the first correction coefficient value K1 and the second correct coefficient value K2 in accordance with the blend ratio. For example, when the blend ratio between the first correction coefficient value K1 and the second correction coefficient value K2 is "7:3", the mixing circuit 23 calculates a value between the first correction coefficient value K1 of the luminance value Xa and the second correction coefficient value K2 of the luminance value Xa and corresponding to the blend ratio "7:3" as the third correction coefficient value K3 as illustrated in FIG. 4A. Further, when the blend ratio between the first correction coefficient value K1 and the second correction coefficient value K2 is "5:5", the mixing circuit 23 calculates a value between the first correction coefficient value K1 of the luminance value Xa and the second correction coefficient value K2 of the luminance value Xa and corresponding to the blend ratio "5:5" as the third correction coefficient value K3 as illustrated in FIG. 4B. Further, when the blend ratio between the first correction coefficient value K1 and the second correction coefficient value K2 is "3:7", the mixing circuit 23 calculates a value between the first correction coefficient value K1 of the luminance value Xa and the second correction coefficient value K2 of the luminance value Xa and corresponding to the blend ratio "3:7" as the third correction coefficient value K3 as illustrated in FIG. 4C.

Then, the correction computation circuit 24 generates the luminance value Xc of the pixel data Pc by multiplying the luminance value Xa of the pixel data Pb (Pa) by the third correction coefficient value K3. Thus, the tone control circuit 20 acquires the third correction coefficient value K3 corresponding to a tone curve differing from the first and second tone curves T1 and T2 in accordance with the blend ratio and corrects the pixel data Pa (Pb) by using the third correction coefficient value K3 to generate the pixel data Pc.

Coefficient data of the correction coefficient curve L1 in the first correction table 21a and coefficient data of the correction coefficient curve L2 in the second correction table 22a are stored by the CPU 10 at a given timing. For example, when initializing the electronic device 1, the CPU 10 stores the coefficient data of the correction coefficient curves L1 and L2 in the correction tables 21a and 22a, respectively. For example, the programs which are executed by the CPU 10 includes a program that calculates the coefficient data of the correction coefficient curves L1 and L2 by using a calculation expression and stores the coefficient data of the correction coefficient curve L1 in the correction table 21a and the coefficient data of the correction coefficient curve L2 in the correction table 22a.

The blend ratio of the mixing circuit 23 is set by the mixing control circuit 26. The mixing control circuit 26 includes a parameter table PT. The CPU 10 stores transition information in the parameter table PT.

The transition information contains the number of transition stages. The number of transition stages indicates the number of times (number of stages) the blend ratio is changed in a stepped manner. Further, the transition information contains a plurality of blend ratios set in correspondence with the number of transition stages. Each of the blend ratios is correlated with one transition stage. For example, the transition information may contain blend ratios of which number corresponds to the number of transition stages. Further, the transition information contains the number of frames correlated with each of the transition stages in correspondence with the number of transition stages. This number of frames represents the number of frames on which mixing is performed by using a blend ratio set at each of the transition stages. That is, the number of frames is independently set for each of the transition stages.

When determining that the correction coefficient value needs to be changed, the CPU 10 outputs a selection signal in accordance with the type of correction. For example, when a correction is made to brighten an image, the tone curve T1 illustrated in FIG. 3A is used. Thus, the CPU 10 outputs a selection signal to select the correction coefficient curve L1 that corresponds to the tone curve T1 (see FIG. 3B). On the other hand, when a correction is made to darken an image, the tone curve T2 illustrated in FIG. 3A is used. Thus, the CPU 10 outputs a selection signal to select the correction coefficient curve L2 that corresponds to the tone curve T2 (see FIG. 3B).

Further, when determining that the correction coefficient value needs to be changed, the CPU 10 stores transition information in a table PT of the mixing control circuit 26. For example, based on the amount of change in luminance value in each frame, the CPU 10 determines whether or not the correction coefficient value needs to be changed. In FIG. 1, for example, the imaging device I/F 11 includes a calculation circuit (not illustrated), which receives image data GD sequentially transferred from the imaging device 2 to calculate a difference in luminance value between the two consecutive frames. The used luminance value of each frame may be, for example, an average value of the luminance values of the image data GD in the frame, a total value of the luminance values of all the pixels in the image data GD in the frame, a maximum luminance value in a histogram (which denotes the number of pixels having the same luminance value), and the like. The circuit that calculates a difference in luminance value may be included in the image signal processing unit 18. Further, the CPU 10 may calculate at least one of the luminance values of each frame and a difference in luminance value between the two frames.

When, for example, the difference in luminance value is not included in a range set by threshold values (differs from values in the range), the CPU 10 determines that the correction coefficient value needs to be changed. Then, for example, based on the difference in luminance value, the CPU 10 sets the transition information in a table PT in the mixing control circuit 26. For example, the CPU 10 sets the blend ratio to increase the ratio of one of the first and second correction coefficient values K1 and K2 and decrease the ratio of the other one of the first and second correction coefficient values K1 and K2 in accordance with the difference in luminance value.

An increase and decrease in the blend ratio corresponds to the correction coefficient curve described below. For example, when selecting the first correction coefficient curve L1, that is, when selecting the first correction coefficient value K1, the CPU 10 sets the blend ratio to increase the ratio of the first correction coefficient value K1 and decrease the ratio of the second correction coefficient value K2. When selecting the second correction coefficient curve L2, that is, when selecting the second correction coefficient value K2, the CPU 10 sets the blend ratio to decrease the ratio of the first correction coefficient value K1 and increase the ratio of the second correction coefficient value K2

When the transition information is written to the table PT by the CPU 10, the mixing control circuit 26 starts an alteration processing (correction value transition processing) on the correction coefficient value of each frame. The mixing control circuit 26 may start the correction value transition processing in response to another control signal output by the CPU 10. For example, the correction value transition processing may be started in response to a start signal output by the CPU 10.

The mixing control circuit 26 determines the timing to output a blend ratio to the mixing circuit 23 based on the signal output from the frame counter 25. For example, the mixing control circuit 26 sets a count-up value, which is equal to the number of frames, in the frame counter 25 and provides the frame counter 25 with the start signal that starts counting. Then, the frame counter 25 counts the frames of an input image (pixel data Pa). For example, the frame counter 25 performs counting using the number of pixels contained in the input image or a signal (e.g., vertical synchronization signal) that controls the input image frames. The frame counter 25 outputs a count-up signal when the count value becomes equal to the count-up value. In response to the count-up signal, the mixing control circuit 26 sets the blend ratio to the mixing circuit 23.

In one example, the transition information stored in the table PT in the mixing control circuit 26 is set as follows:
number of transition stages=3,
blend ratio "7:3" and number of frames "2" for the first stage,
blend ratio "5:5" and number of frames "2" for the second stage, and
blend ratio "3:7" and number of frames "2" for the third stage.

Here, in response to the control signal output from the mixing control circuit 26, the mixing circuit 23 performs tone correction using the first correction circuit 21. Thus, as illustrated in FIG. 6A, the first frame image F1 undergoes tone correction using the first correction coefficient value K1 in the first correction circuit 21. In the present example, the tone control circuit 20 calculates a third correction coefficient value K3 (K1) that corresponds to the pixel data Pa of the first frame image F1 and multiplies the pixel data Pa by the third correction coefficient value K3 to output pixel data Pc.

Then, when transition information is written by the CPU 10 to the table PT before correction is started on the second frame image F2, the mixing control circuit 26 starts correction value transition processing in accordance with the transition information stored in the table PT.

First, the mixing control circuit 26 provides the frame counter 25 with the start signal and a count-up value that corresponds to the number of the first stage. When receiving the count-up value, the frame counter 25 clears its count value and starts counting in response to the start signal. Further, the mixing control circuit 26 provides the mixing circuit 23 with blend ratio "7:3" that corresponds to the first stage.

The mixing circuit 23 generates a third correction coefficient value K3 by mixing the first correction coefficient value K1 output from the first correction circuit 21 and the second correction coefficient value K2 output from the second correction circuit 22. Based on the third correction coefficient value K3, the correction computation circuit 24 generates pixel data Pc from the pixel data Pb (Pa). Thus, as illustrated in FIG. 6A, the second frame image F2 undergoes tone correction by using the third correction coefficient value K3 obtained by mixing the first correction coefficient value K1 and the second correction coefficient value K2 at the blend ratio "7:3".

When the correction processing on the second frame image F2 ends (actually, when all the pixel data Pa contained in the second frame image F2 are input to the frame counter 25), the frame counter 25 counts up the count value. Since the present count value is "1", the frame counter 25 does not output the count-up signal. Thus, the mixing control circuit 26 does not update the blend ratio output value. Accordingly, the mixing circuit 23 calculates the third correction coefficient value K3 in accordance with the earlier set blend ratio "7:3". As a result, as illustrated in FIG. 6A, the third frame image F3 undergoes tone correction using the third correction coefficient value K3 obtained by mixing the first correction coefficient value K1 and the second correction coefficient value K2 at the blend ratio "7:3".

When the correction processing on the third frame image F3 ends, the frame counter 25 counts up the count value. Since the count value is "2" presently, the frame counter 25 outputs the count-up signal. In response to the count-up signal, the mixing control circuit 26 provides the frame counter 25 with the number of frames (=2) that corresponds to the next transition stage (second stage). When receiving the count-up value, the frame counter 25 clears the count value and starts counting in response to the start signal from the mixing control circuit 26. Further, the mixing control circuit 26 provides the mixing circuit 23 with a blend ratio "5:5" that corresponds to the second stage.

In accordance with the blend ratio, the mixing circuit 23 generates a third correction coefficient value K3 by mixing the first correction coefficient value K1 output from the first correction circuit 21 and the second correction coefficient value K2 output from the second correction circuit 22. Based on the third correction coefficient value K3, the correction computation circuit 24 generates pixel data Pc from the pixel data Pb (Pa). Thus, as illustrated in FIG. 6A, the fourth frame image F4 undergoes tone correction by using the third correction coefficient value K3 obtained by mixing the first correction coefficient value K1 and the second correction coefficient value K2 at the blend ratio "5:5"

In the same manner, the fifth frame image F5 undergoes tone correction by using the third correction coefficient value K3 obtained by mixing the first correction coefficient value K1 and the second correction coefficient value K2 at the blend ratio "5:5". Further, the sixth and seventh frame images F6 and F7 undergo tone correction by using the third correction coefficient value K3 obtained by mixing the first correction coefficient value K1 and the second correction coefficient value K2 at the blend ratio "3:7".

When the correction processing on the seventh frame image F7 ends, the frame counter 25 counts up the count value. Since the present count value is "2", the frame counter 25 outputs the count-up signal. The mixing control circuit 26 receives the count-up signal and compares the number of times the count-up signal has been input and the number of the transition stages. When the number of inputs is equal to the number of the transition stages, the mixing control circuit 26 determines that the correction value transition processing is completed. Then, based on the selection signal output from the CPU 10, the mixing control circuit 26 outputs a control signal to select the second correction coefficient value K2 in the second correction circuit 22. The mixing circuit 23 selects the second correction coefficient value K2 in response to the control signal and outputs the third correction coefficient value K3, which is equal to the second correction coefficient value K2.

Based on the third correction coefficient value K3, the correction computation circuit 24 generates pixel data Pc from the pixel data Pb (Pa). Thus, as illustrated in FIG. 6A, the eighth frame image F8 undergoes tone correction by using the third correction coefficient value K3 equal to the second correction coefficient value K2.

As another example, the transition information stored in the table PT in the mixing control circuit 26 is set as follows: number of transition stages=2,
blend ratio "7:3" and number of frames "3" for the first stage, and
blend ratio "3:7" and number of frames: "2" for the second stage.

Further, it is assumed that tone correction is first performed using the first correction circuit 21. In this case, in the same manner as the frame transition illustrated in FIG. 6A, the second to fourth frame images F2 to F4 undergo tone correction by using the third correction coefficient value K3 obtained by mixing the first correction coefficient value K1 and the second correction coefficient value K2 at the blend ratio "7:3". The fifth and sixth frame images F5 and F6 undergo tone correction by using the third correction coefficient value K3 obtained by mixing the first correction coefficient value K1 and the second correction coefficient value K2 at the blend ratio "3:7". Then, the seventh frame image F7 undergoes tone correction by using the third correction coefficient value K3 equal to the second correction coefficient value K2.

The first embodiment has the advantages described below.

(1) When shifting from tone correction performed with the first correction coefficient value K1 in the first correction circuit 21 to that performed with the second correction coefficient value K2 in the second correction circuit 22, the tone control circuit 20 changes the correction coefficient value for the tone correction in a plurality of stages (for example, three stages).

Thus, even when there is a significant difference between a correction coefficient curve stored in the first correction table 21a and that stored in the second correction table 22a, the luminance of a plurality of the luminance of the image viewed by a viewer changes in a stepped manner. As a result, sudden changes in image luminance are prevented. This generates frame images viewed without awkwardness by the viewer.

(2) The tone control circuit 20 performs tone correction with the same correction coefficient value K3 on images of the number of frames set in each transition stage and then shifts to the next transition stage. This allows the amount of change in luminance to be set for consecutive frame images. In other words, the amount of change in luminance per unit time, that is, the amount of change in (average value of) luminance for the number of frames required in transition may be set. This generates frame images viewed without awkwardness by the viewer.

(3) The tone control circuit 20 calculates the correction coefficient value K3 for each frame image when the CPU 10 sets the transition information. This changes tone correction on each frame image in a stepped manner. Thus, the luminance of a plurality of consecutive frame images is changed in a stepped manner. Accordingly, the CPU 10 does not have to perform processing such as rewriting of the tone curve. This prevents the load on the CPU 10 from increasing.

Second Embodiment

Figure 7:
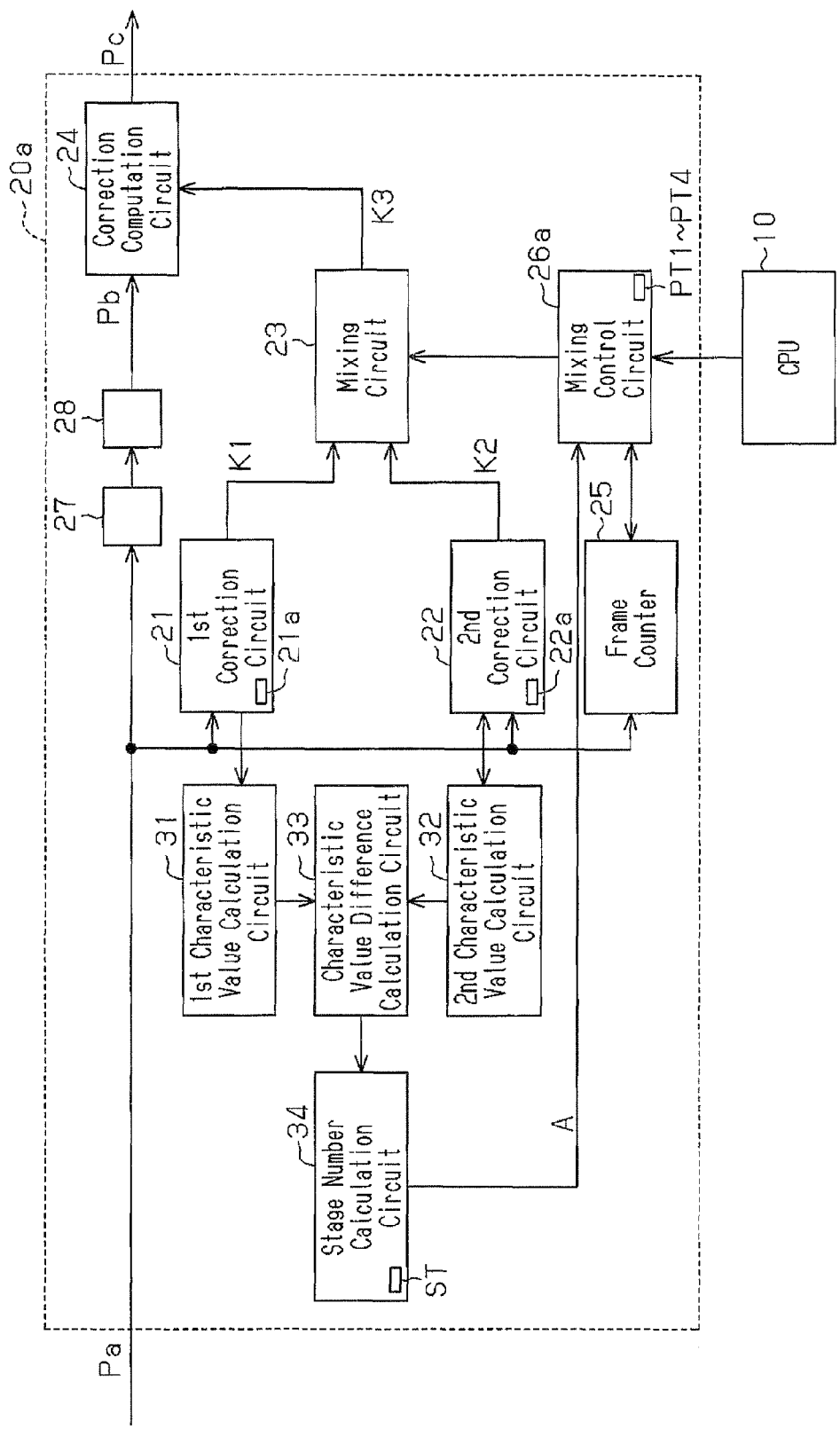
FIG. 7 is a block circuit diagram of a tone control circuit in a second embodiment.

As illustrated in FIG. 7, a tone control circuit 20a includes a first correction circuit 21, a second correction circuit 22, a mixing circuit 23, a correction computation circuit 24, a frame counter 25, a mixing control circuit 26a, a first flip-flop circuit 27, and a second flip-flop circuit 28. Further, the tone control circuit 20a includes a first characteristic value calculation circuit 31, a second characteristic value calculation circuit 32, a characteristic value difference calculation circuit 33, and a stage number calculation circuit 34.]

Figure 8:
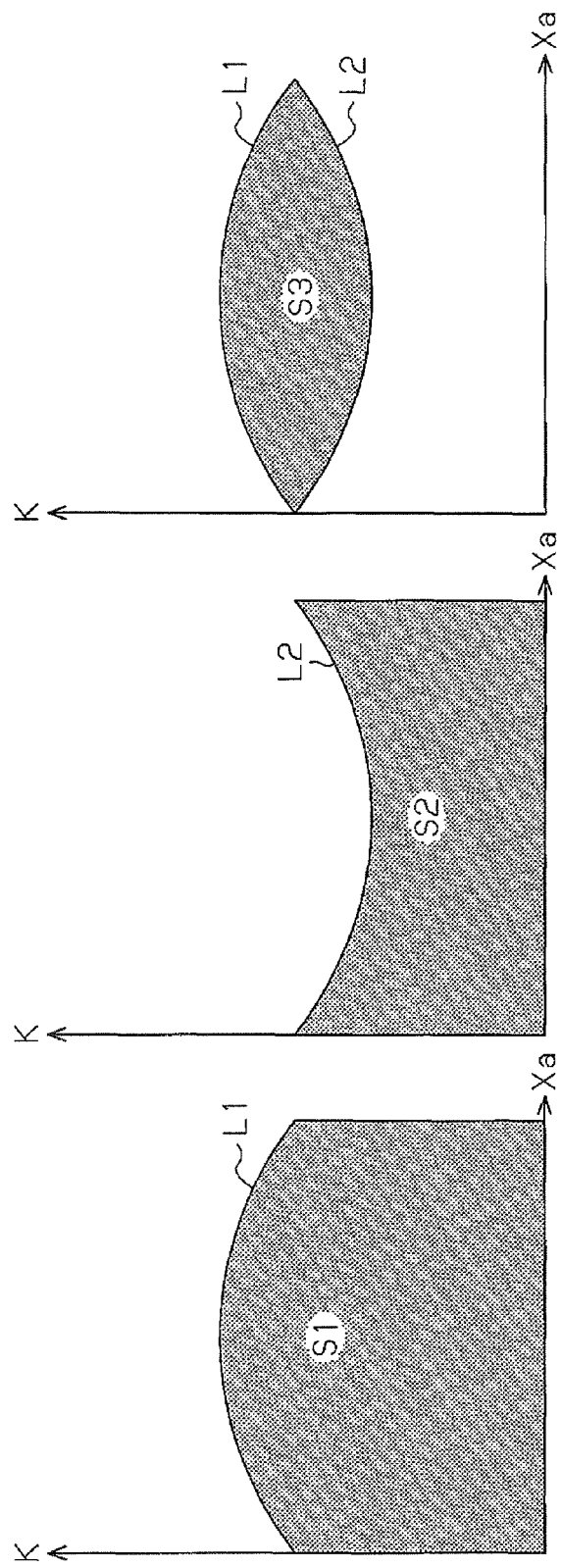
FIGS. 8A to 8C are explanatory graphs of transition stage count determination processing.

The first characteristic value calculation circuit 31 calculates a characteristic value of a correction coefficient value stored in a first correction table 21a of the first correction circuit 21. The characteristic value is the total sum value of, for example, the correction coefficient values in a given range representing a correction coefficient curve. The given range covers input values of the first correction circuit 21, that is, from a first value to a second value for the luminance value Xa. For example, the given range is set as the entire range of the input value (0 to 255 when the input value has eight bits). In this case, the total sum value of the correction coefficient values is the area determined by a correction coefficient curve in the given range. The area determined by the correction coefficient curve L1 is the region sandwiched between the correction coefficient curve L1 and the axis of the input value (luminance value Xa) as illustrated in FIG. 8A. A first correction characteristic value calculation circuit 31 accumulates a correction coefficient value K for each luminance value Xa when, for example, the CPU 10 stores the correction coefficient value K in the first correction table 21a of the first correction circuit 21 and generates a first characteristic value S1 indicating the accumulated value.

A second characteristic value calculation circuit 32 calculates a characteristic value of the correction coefficient value stored in a second correction table 22a of the second correction circuit 22. The characteristic value is an area determined by a correction coefficient curve L2 that indicates the correction coefficient value stored in the second correction table 22a as illustrated in FIG. 8B. In the same manner as the first characteristic value calculation circuit 31, the second characteristic value calculation circuit 32 accumulates the correction coefficient value K for each luminance value Xa, and generates a second characteristic value S2 that indicates the accumulated value.

The characteristic value difference calculation circuit 33 calculates a characteristic value difference S3 based on the first characteristic value S1 output from the first characteristic value calculation circuit 31 and the second characteristic value S2 output from the second characteristic value calculation circuit 32. For example, the characteristic value difference calculation circuit 33 calculates the difference between the first characteristic value S1 and the second characteristic value S2 to obtain the absolute value of the difference as the characteristic value difference S3. One example of the characteristic value difference S3 is illustrated in FIG. 8C.

The stage number calculation circuit 34 receives the characteristic value difference S3 calculated by the characteristic value difference calculation circuit 33. The stage number calculation circuit 34 includes a stage number calculation table ST for obtaining the number of transition stages. The stage number calculation table ST stores a stage number A that changes in a stepped manner in accordance with the characteristic value difference S3. Information that determines the stage number A in the stage number calculation table ST is stored by, for example, the CPU 10. The CPU 10 stores in the table ST a partition boundary value BD, which partitions the range of input values (characteristic value differences S3) into a plurality of sections, and the stage number A (offset value OF), which corresponds to each section.

For example, the partition boundary values are set as BD1 to BD3 and the offset values are set as OF0 to OF3. When the input value (characteristic value difference S3) is 0 or greater and less than BD1, the offset value OF0 is used. When the input value (characteristic value difference S3) is BD1 or greater and less than BD2, the offset value OF1 is used. When the input value (characteristic value difference S3) is BD2 or greater and less than BD3, the offset value OF2 is used. When the input value (characteristic value difference S3) is BD3 or greater (upper limit is the maximum value), the offset value OF3 is used. Each of the offset values OF0 to OF3 is the stage number A that corresponds to the input value (characteristic value difference S3) in each section.

Figure 9:
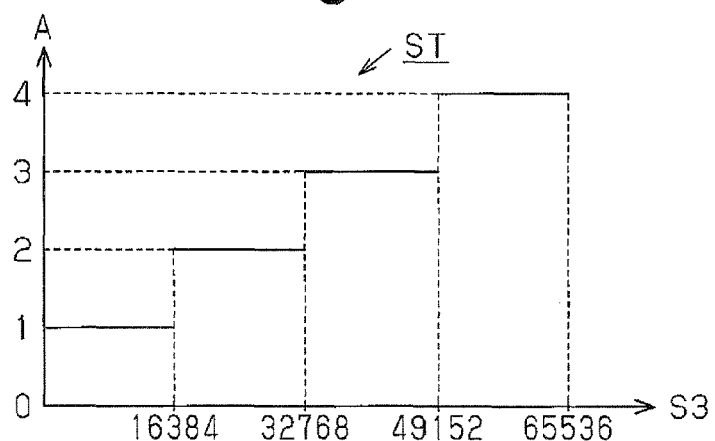
FIG. 9 is an explanatory graph of a stage count calculation table.
Figure 10:
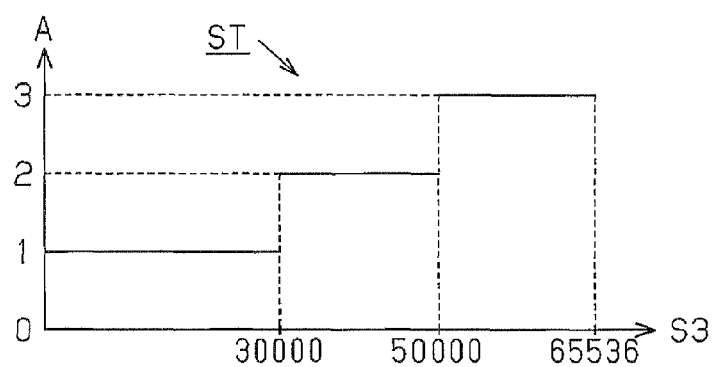
FIG. 10 is an explanatory graph of a modification of the stage count calculation table.
Figure 11:
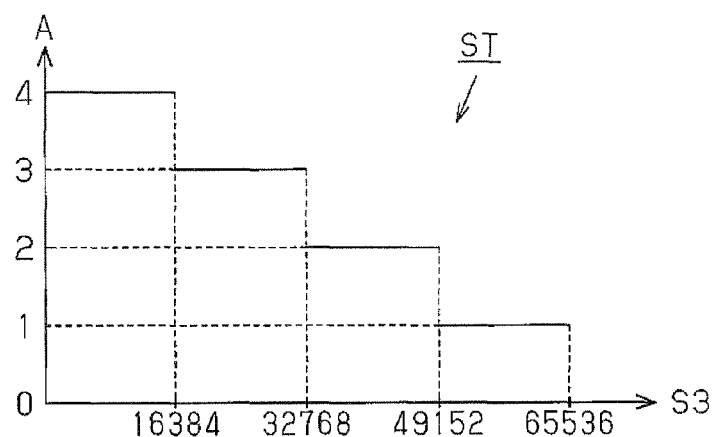
FIG. 11 is an explanatory graph of another modification of the stage count calculation table.

When the luminance Xa and the correction coefficient value K are represented by an eight-bit digital value, each takes on a value between "0" and "255". Accordingly, the first characteristic value S1, the second characteristic value S2, and the characteristic value difference S3 each take a value between "0" and "65536". FIG. 9 illustrates a first example of the stage number calculation table ST. In this example, the partition boundary values BD1 through BD3 are set to "16384", "32768", and "49152", and the offset values OF0 through OF3 are set to "1" to "4". FIG. 10 illustrates a second example of the stage number calculation table ST. In this example, the partition boundary values BD1 and BD2 are set to "30000" and "50000" and the offset values OF0 to OF2 are set to "1" to "3". FIG. 11 illustrates a third example of the stage number calculation table ST. In this example, the partition boundary values BD1 through BD3 are set to "16384", "32768", and "49152", and the offset values OF0 to OF3 are set to "4" to "1".

The stage number calculation circuit 34 outputs the stage number A (offset value OF) that corresponds to the input characteristic value difference S3. The mixing control circuit 26a receives the stage number A output from the stage number calculation circuit 34.

The mixing control circuit 26a includes parameter tables PT1 to PT4. The parameter tables PT1 to PT4 each store transition information that corresponds to the number of transition stages (i.e., the stage number A). The transition information is stored in association with a transition stages number m, a blend ratio for each stage, and a frame number n that undergoes tone correction in each stage.

For example, the parameter table PT1 illustrated in FIG. 12A indicates transition information that corresponds to the transition stage number "4". The parameter table PT2 illustrated in FIG. 12B indicates transition information that corresponds to the transition stages number "3". The parameter table PT3 illustrated in FIG. 12C indicates transition information that corresponds to the transition stages number "2". The parameter table PT4 illustrated in FIG. 12D indicates transition information that corresponds to the transition stages number "1".

As illustrated in FIG. 12A, the parameter table PT1 corresponding to the transition stage number "4" (that is, the stage number A=4) stores the blend ratio in each of the first to fourth stages and the number of frames to be processed at each stage. For example, the transition stage number of "1" is associated with the blend ratio of "8:2" and the frame number of "2". The transition stage number of "2" is associated with the blend ratio of "6:4" and the frame number of "3". The transition stage number of "3" is associated with the blend ratio of "4:6" and the frame number of "3". The transition stage number of "4" is associated with the blend ratio of "2:8" and the frame number of "2".

In response to a selection signal (stage number A in this example) output from the stage number calculation circuit 34, the mixing control circuit 26a selects the parameter table that corresponds to the selection signal. Then, the mixing control circuit 26a controls the mixing circuit 23 and the frame counter 25 in accordance with the transition information stored in the selected parameter table.

In addition to the advantages of the first embodiment, the second embodiment has the advantages described below.

(4) The first characteristic value calculation circuit 31 calculates the characteristic value S1 that corresponds to the correction coefficient curve L1 in the first correction table 21a. The second characteristic value calculation circuit 32 calculates the characteristic value S2 that corresponds to the correction coefficient curve L2 in the second correction table 22a. The characteristic value difference calculation circuit 33 calculates the characteristic value difference S3 that indicates the absolute value of the difference between the first characteristic value S1 and the second characteristic value S2. The stage number calculation circuit 34 includes the stage number calculation table ST and outputs the stage number A that corresponds to the characteristic value difference S3. Then, the mixing control circuit 26a selects a parameter table that corresponds to the stage number A and controls the mixing circuit 23 and the frame counter 25 in accordance with transition information stored in the parameter table.

Accordingly, in accordance with the difference between the correction coefficient curve L1 in the first correction table 21a and the correction coefficient curve L2 in the second correction table 22a, the number of transition stages, the blend ratio, and the number of frames are automatically determined. Thus, the CPU 10 does not have to store the transition information in the mixing control circuit 26a when changing the correction coefficient value for tone correction. This reduces the loads on the CPU 10.

(5) When the stage number calculation table ST is set so that the number of transition stages (stage number A) increases as the characteristic value difference S3 increases (for example, refer to FIGS. 9 and 10), the difference in luminance between the consecutive two frames decreases. As a result, a viewer may view image of which luminance changes more continuously.

The first and second embodiments may be modified as described below.

Figure 13:
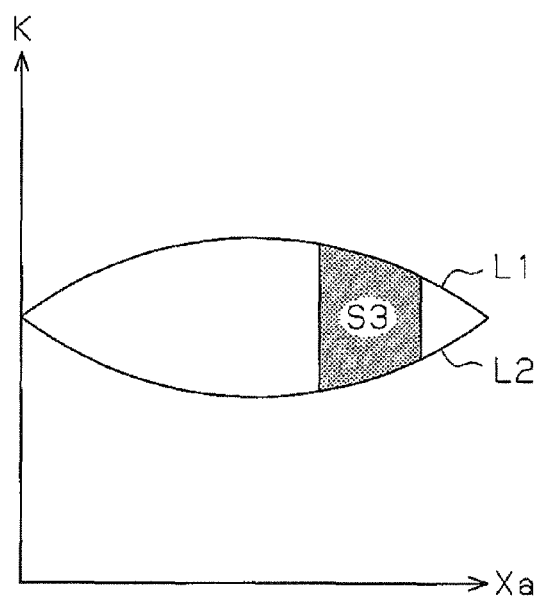
FIG. 13 is an explanatory graph of a modification of characteristic value difference calculation processing.
Figure 14:
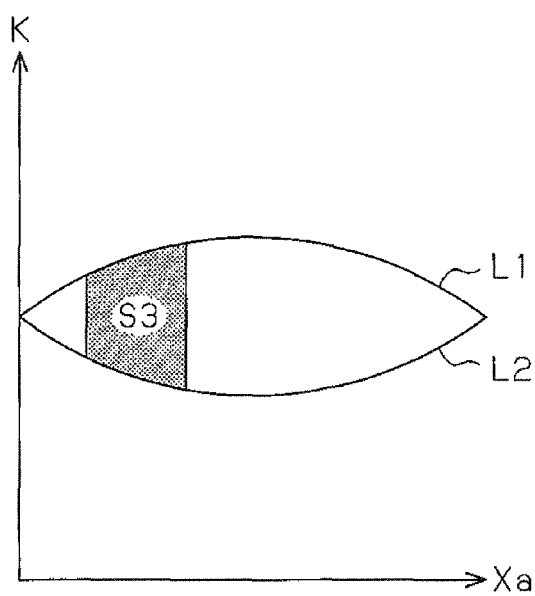
FIG. 14 is an explanatory graph of another modification of the characteristic value difference calculation processing.

The second embodiment obtains the characteristic value difference S3 for each luminance value Xa in the correction table as illustrated in FIGS. 8A to 8C. Instead, the characteristic value difference S3 may be calculated using the luminance value Xa in a given range and a correction coefficient value K corresponding to the luminance value Xa. For example, the characteristic value difference S3 may be obtained in a range in which the luminance value Xa is large as illustrated in FIG. 13. Further, the characteristic value difference S3 may be obtained in a range in which the luminance value Xa is small as illustrated in FIG. 14.

The second embodiment uses the total sum of the correction coefficient values in the given range as a characteristic value of the correction coefficient curve. Instead, a correction coefficient value for a given luminance value may be used. Alternatively, a gradient, a maximum value, or a minimum value of a correction coefficient curve for a given luminance value may be used.

The correction coefficient value K1 in the first correction table 21a or the correction coefficient value K2 in the second correction table 22a may be changed (rewritten). For example, the CPU 10 may rewrite correction data in at least one of the first correction table 21a and the second correction table 22a by using a correction coefficient value specified through operation of the operation input device. In the second embodiment, a characteristic value difference S3 is generated by using the characteristic values S1 and S2 in the correction tables 21a and 22a respectively calculated by the characteristic value calculation circuits 31 and 32, and one of the parameter tables PT1 to PT4 is automatically selected in accordance with a stage number A that corresponds to the characteristic value difference S3. Accordingly, when the correction coefficient values K1 and K2 in the correction tables 21a and 22a are changed, the CPU 10 does not need to change the transition information. This reduces the load on the CPU 10.

Further, the CPU 10 may be provided with a function that forcibly terminates the correction value transition processing when the blend ratio is being changed in a stepped manner. For example, it is assumed here that the blend ratio is being changed in a stepped manner from a first correction coefficient value K1 in the first correction circuit 21 to a second correction coefficient value K2 in the second correction circuit 22. During the transition, for example, an event may occur in which the correction coefficient curve for the first correction table 21a is rewritten (from the first correction coefficient value K1 to K1a). In this case, as illustrated in FIG. 15A, the correction coefficient curve in the first correction table 21a may not be rewritten to a different correction coefficient curve (first correction coefficient value K1a) until tone correction using the correction coefficient value K1 in the first correction table 21a, that is, tone correction of the fourth frame image F4 is completed.

Figure 15:
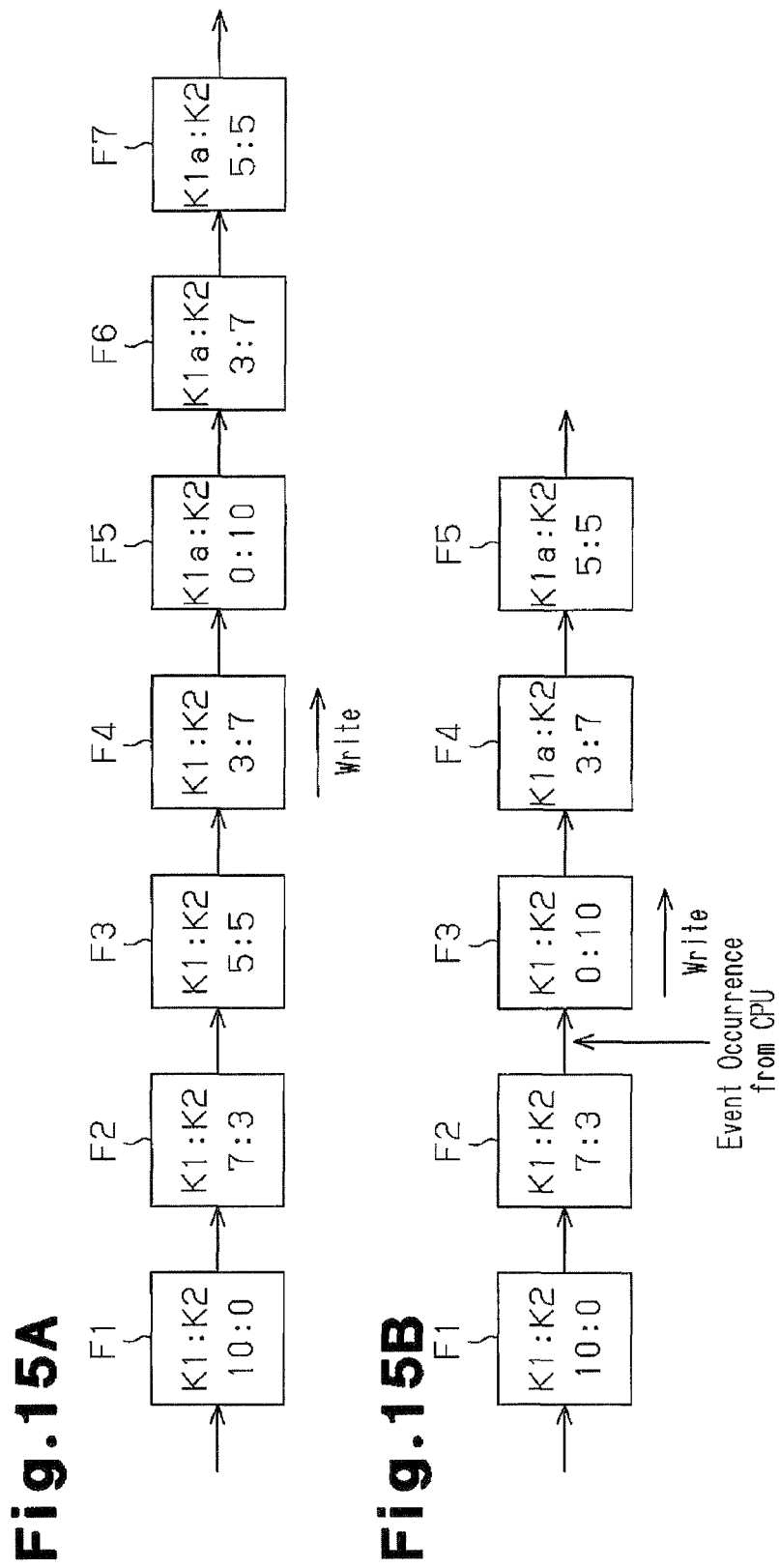
FIGS. 15A and 15B are explanatory diagrams of a modification of tone correction.

In contrast, as illustrated in FIG. 15B, by forcibly terminating transition, the CPU 10 immediately uses the second correction coefficient value K2 in the second correction table 22a to perform tone correction on the third frame image F3. Then, the CPU 10 completes rewriting of the correction coefficient curve in the first correction table 21a (from the first correction coefficient value K1 to K1a) while tone correction is being performed by using the second correction coefficient value K2 in the second correction table 22a. This allows for tone correction from the second correction coefficient value K2 in the second correction circuit 22 to the first correction coefficient value K1a in the first correction circuit 21 to be quickly performed from the fourth frame image F4.

Figure 16:
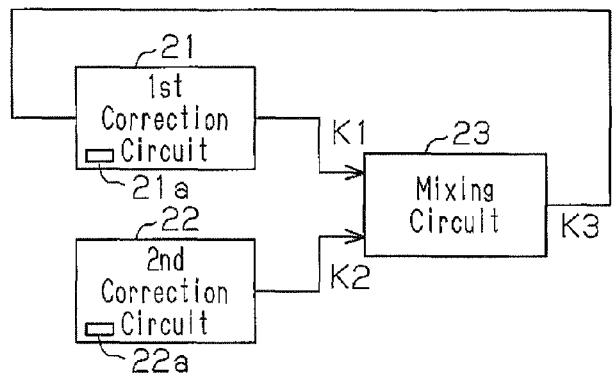
FIG. 16 is a block circuit diagram illustrating a modification of writing to a correction table.

The tone control circuit may be configured so that the correction coefficient values in the correction tables 21a and 22a may be changed. For example, as illustrated in FIG. 16, the correction coefficient value K3 output from the mixing circuit 23 may be provided to, for example, the first correction circuit 21. In this modification, the first correction circuit 21 is provided with the third correction coefficient value K3 generated by mixing the first correction coefficient value K1 of the first correction circuit 21 and the second correction coefficient value K2 of the second correction circuit 22 with the blend ratio "K1:K2" of, for example, 7:3.

Accordingly, when an event that rewrites a correction coefficient curve in the second correction table 22a of the second correction circuit 22 occurs during the transition, the third correction coefficient value K3 obtained with the blend ratio of "K1:K2"=7:3 is written to the first correction table 21a. The CPU 10 stores a correction coefficient value for a different coefficient curve in the second correction table 22a. Then, the first correction coefficient value K1 in the first correction circuit 21 and the second correction coefficient value K2 in the second correction circuit 22 are mixed to perform tone correction at each stage.

Accordingly, the correction coefficient value may be easily changed during the transition. In addition, the correction coefficient value for the correction coefficient curve is stored in the first correction table 21a based on the third correction coefficient value K3 obtained by the mixing circuit 23 at a given blend ratio. This reduces the load on the CPU 10.

In each of the above embodiments, the mixing circuit 23 is provided with the selection signal to select either one of the first and second correction coefficient values K1 and K2. Instead, the mixing circuit 23 may be provided with a control signal that specifies such a blend ratio in which the percentage of one of the two correction coefficient values is set to 0 (zero). In this case, the mixing circuit 23 stops accessing the correction circuit in which the percentage of the correction coefficient value is set to 0, that is, control is conducted so that there is no response to the pixel data Pa. This allows the CPU 10 to, for example, change the value of a correction table (correction data) contained in the correction circuit.

Third Embodiment

Figure 17:
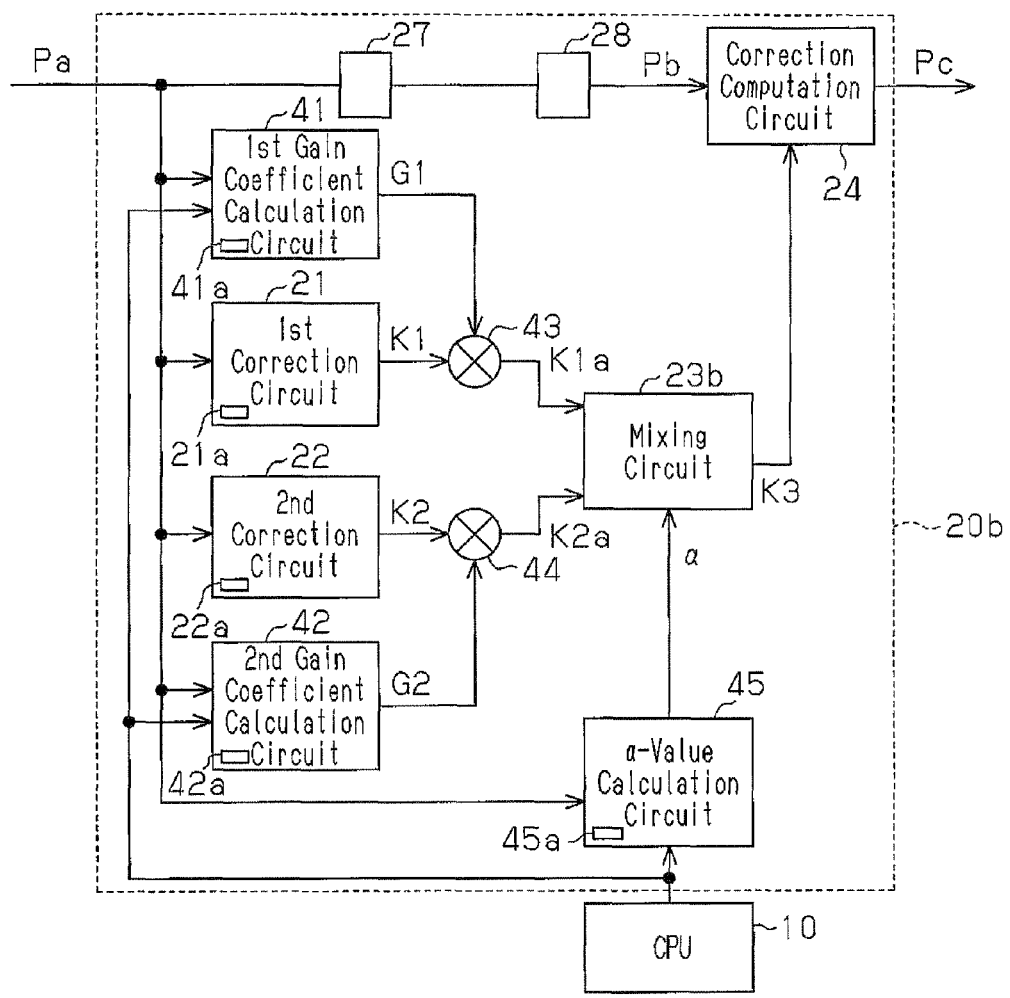
FIG. 17 is a block circuit diagram of a tone control circuit in a third embodiment.

As illustrated in FIG. 17, a tone control circuit 20b includes a first correction circuit 21, a second correction circuit 22, a mixing circuit 23b, a correction computation circuit 24, a first flip-flop circuit 27, and a second flip-flop circuit 28. Further, the tone control circuit 20b includes a first gain coefficient calculation circuit 41, a second gain coefficient calculation circuit 42, a first multiplication circuit 43, a second multiplication circuit 44, and an α-value calculation circuit 45.

The first gain coefficient calculation circuit 41 includes a polygonal line table 41a. The polygonal line table 41a is used to obtain a gain coefficient G (first gain coefficient G1) for a luminance value Xa of pixel data Pa and includes a computation circuit that obtains an output value from, for example, a parameter and an input value. The polygonal line table 41a is one example representing a first gain characteristic. The first gain coefficient calculation circuit 41 receives pixel data Pa (with a luminance value Xa) and obtains a first gain coefficient G1 from the polygonal line table 41a in accordance with the luminance value Xa. The first multiplication circuit 43 multiplies a first correction coefficient value K1, which is output from the first correction circuit 21, by the first gain coefficient G1, which is output from the first gain coefficient calculation circuit 41, to generate a first correction coefficient value K1a that indicates the product.

The second gain coefficient calculation circuit 42 includes a polygonal line table 42a. The polygonal line table 42a is used to obtain a gain coefficient G (second gain coefficient G2) for a luminance value Xa of pixel data Pa and includes an computation circuit that obtains an output value from, for example, a parameter and an input value. The polygonal line table 42a is one example representing a second gain characteristic. The second gain coefficient calculation circuit 42 receives pixel data Pa (with a luminance value Xa) and obtains a second gain coefficient G2 from the polygonal line table 42a in accordance with the luminance value Xa. The second multiplication circuit 44 multiplies a second correction coefficient value K2, which is output from the second correction circuit 22, by the second gain coefficient G2, which is output from the second gain coefficient calculation circuit 42, to generate a second correction coefficient value K2a that indicates the product.

The α-value calculation circuit 45 includes a polygonal line table 45a. The polygonal line table 45a is used to obtain an α-value for a luminance value Xa of pixel data Pa and includes a computation circuit that obtains an output value from, for example, a parameter and an input value. The α-value is a coefficient used when mixing two images. That is, the α-value corresponds to a blend ratio. The α-value calculation circuit 45 receives pixel data Pa (with a luminance value Xa) and obtains an α-value from the polygonal line table 45a in accordance with the luminance value Xa.

Figure 18:
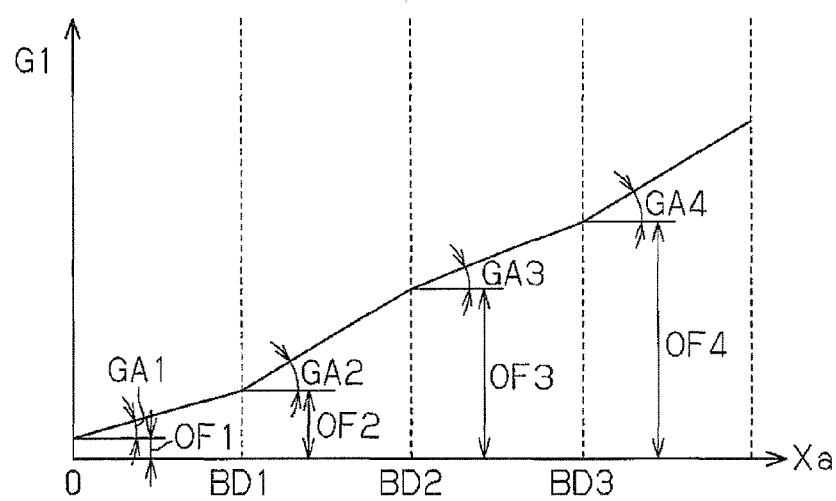
FIG. 18 is an explanatory graph of a gain coefficient table.

FIG. 18 is a characteristic graph illustrating the polygonal line table 41a of the first gain coefficient calculation circuit 41. In the first polygonal line table 41a, a range of the luminance value Xa, which is an input value, is divided into a plurality of section. In FIG. 18, the range of the luminance value Xa is divided into four sections. In the first polygonal line table 41a, an output value G1 is calculated from the expression illustrated below.

$$G1 = Xa \times GA + OF$$

Here, an offset value OF (OF1 to OF4) for the minimum value in each section (0, BD1, BD2, and BD3) and a gradient GA (GA1 to GA4) of a straight line extending through the offset value OF are used. A second polygonal line table 42a and a polygonal line table 45a calculate an output value using the same expression as that for the first polygonal line table 41a. The CPU 10 replaces parameters of the polygonal line tables 41a, 42a, and 45a at corresponding given timings to change table characteristics. Further, the polygonal line tables 41a, 42a, and 45a store output values using, for example, an RAM instead of a circuit that calculates the output value through computations.

The mixing circuit 23b receives a first correction coefficient value K1a from the first multiplication circuit 43 and a second correction coefficient value K2a from the second multiplication circuit 44. Further, the mixing circuit 23b receives an α-value from the α-value calculation circuit 45. The mixing circuit 23b mixes the first correction coefficient value K1a and the second correction coefficient value K2a based on the α-value and calculates a third correction coefficient value K3. For example, the mixing circuit 23b calculates the third correction coefficient value K3 by using an α-blend expression.

The α-blend expression, which uses an α-value, a first correction coefficient value K1a, and a second correction coefficient value K2a, is illustrated below.

$$K3 = K1a \times \alpha + K2a \times (1-\alpha)$$

In the α-blend expression, the third correction coefficient value K3 is approximate to the first correction coefficient value K1a of the first correction circuit 21 when the α-value is large and approximate to the second correction coefficient value K2a of the second correction circuit 22 when the α-value is small.

Figure 19:
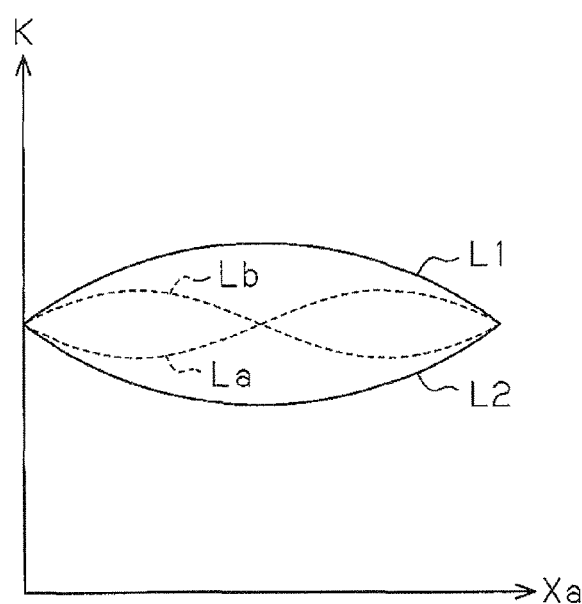
FIG. 19 is a characteristic graph of correction coefficient values.

For example, as illustrated in FIG. 19, the first correction coefficient curve L1 is stored in the first correction table 21a, and the second correction coefficient curve L2 is stored in the second correction table 22a. First and second gain coefficients G1 and G2, each set at "1", are respectively output from the first gain coefficient calculation circuit 41 and the second gain coefficient calculation circuit 42.

Figure 20:
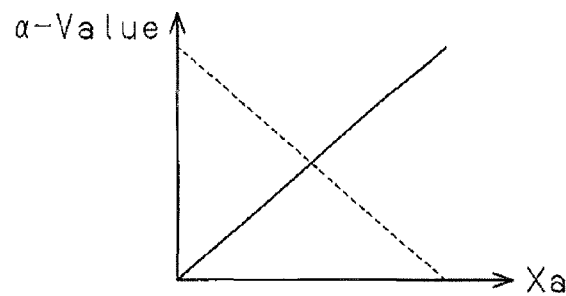
FIG. 20 is an explanatory graph of a polygonal line table.

In one example, when the polygonal line in the polygonal line table 45a for calculating the α-value is as indicated by the solid line illustrated in FIG. 20, the third correction coefficient value K3 output from the mixing circuit 23b is plotted along a characteristic curve indicated by a broken line La in FIG. 19. As another example, when the polygonal line in the polygonal line table 45a for calculating the α-value is as indicated by the broken line illustrated in FIG. 20, the third correction coefficient value K3 output from the mixing circuit 23b is plotted along a characteristic curve indicated by a broken line Lb in FIG. 19.

In addition to the advantages of the above embodiments, the third embodiment has the advantages described below.

(6) The third correction coefficient value K3 is changed by changing the shape of a polygonal line in the polygonal line table 45a of the α-value calculation circuit 45 using parameters. Thus, the third correction coefficient value K3, which is actually used, is quickly changed without rewriting the correction coefficient curves in the first correction table 21a and the second correction coefficient table 22a.

That is, the third correction coefficient value K3 is quickly changed by having the CPU 10 provide the α-value calculation circuit 45 with a control signal that specifies parameters, the number of sections, an offset value for each section, and the like, which change the shape of the polygonal line table 45a of the α-value calculation circuit 45.

(7) The shape of a characteristic curve plotted by the third correction coefficient value K3 is changed by changing the shapes of the polygonal lines in the polygonal line tables 41a, 42a, and 45a. Accordingly, the pixel data Pc output from the tone control circuit 20b is easily corrected in correspondence with the pixel data Pa input to the tone control circuit 20b. That is, the shape of a tone curve applied to the pixel data Pa may be easily changed. Further, a tone correction using a complex tone curve such as a cubic curve may be performed by setting partition values (offset value OF, gradient GA).

It should be apparent to those skilled in the art that the invention may be embodied in many other specific forms without departing from the spirit or scope of the invention. Particularly, it should be understood that the invention may be embodied in the following forms.

The modifications of the first and second embodiments may be applied to the third embodiment.

Figure 21:
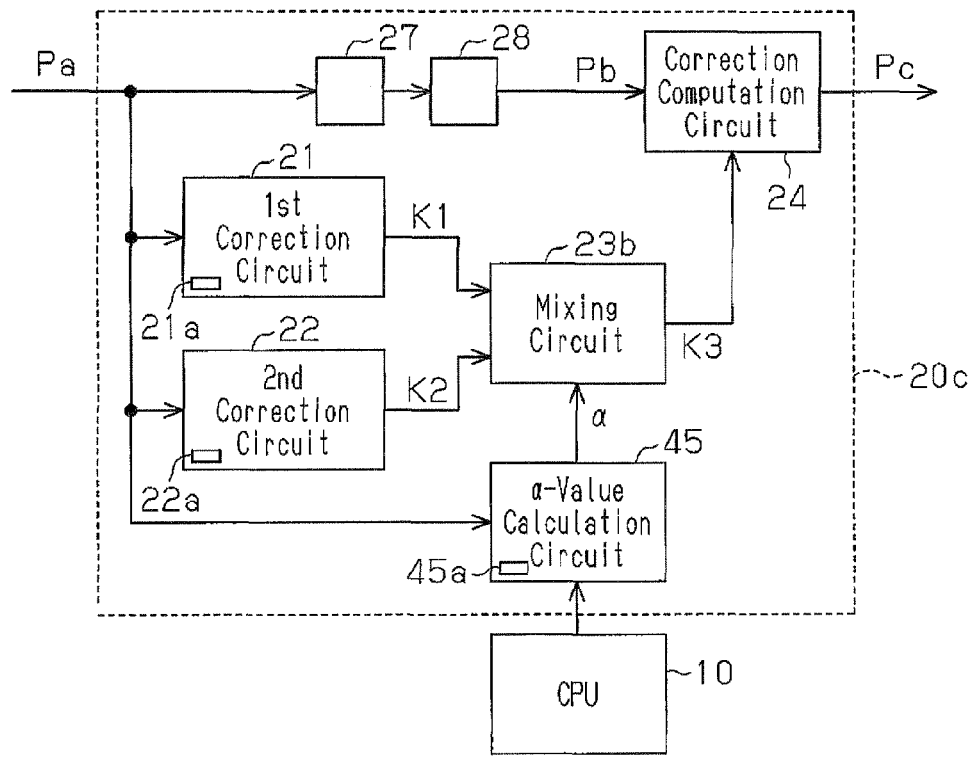
FIG. 21 is a block circuit diagram illustrating a modification of the tone control circuit.

The configuration of the tone control circuit in each of the above embodiments may be changed. For example, a tone control circuit 20c may be configured as illustrated in FIG. 21. The tone control circuit 20c includes the first correction circuit 21, the second correction circuit 22, the mixing circuit 23b, the flip-flop circuits 27 and 28, the correction computation circuit 24, and the α-value calculation circuit 45.

Figure 22:
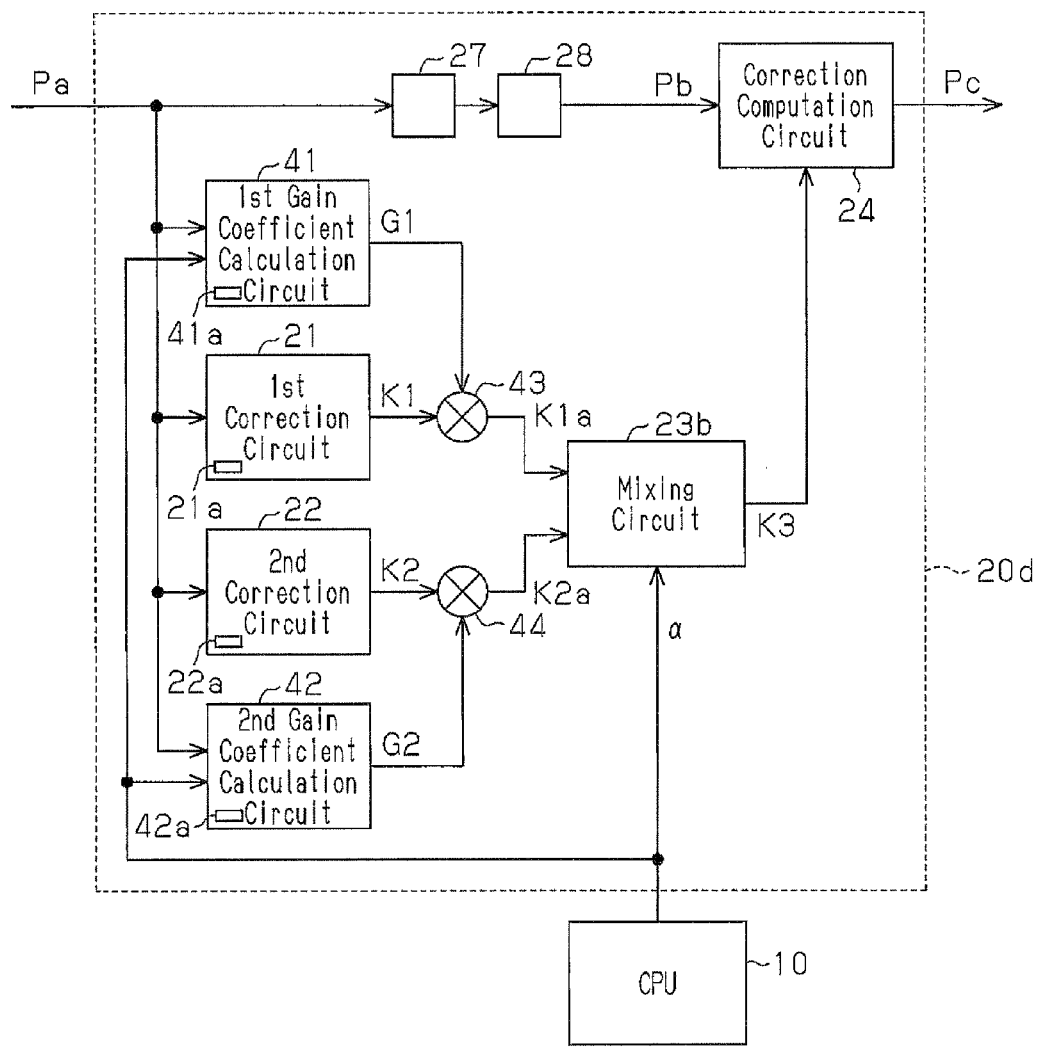
FIG. 22 is a block circuit diagram illustrating another modification of the tone control circuit.

Further, a tone control circuit 20d may be configured as illustrated in FIG. 22. The tone control circuit 20d includes the correction circuits 21 and 22, the mixing circuit 23b, correction computation circuit 24, the flip-flop circuits 27 and 28, the gain coefficient calculation circuits 41 and 42, and the multiplication circuits 43 and 44. In this configuration, the CPU 10 sets an α-value for the mixing circuit 23b.

Figure 23:
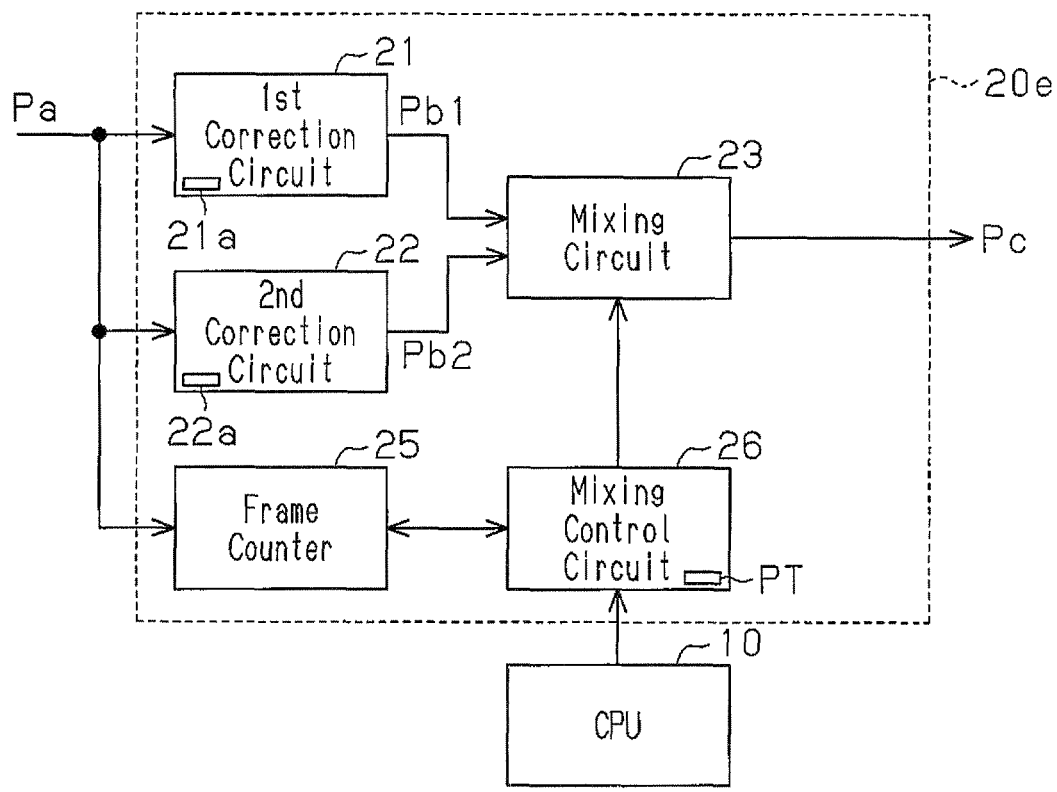
FIG. 23 is a block circuit diagram illustrating a further modification of the tone control circuit.

In the embodiments described above, the first correction circuit 21 and the second correction circuit 22 respectively store the correction coefficient values K1 and K2 of the correction coefficient curves L1 and L2 corresponding to the tone curves T1 and T2 in a table format but may also store data of the tone curves T1 and T2. FIG. 23 illustrates one example of such a tone control circuit 20e.

The first correction table 21a of the first correction circuit 21 stores the data of a correction curve (for example, tone curve T1 illustrated in FIG. 3A) used to obtain the luminance value Xc of an output pixel (pixel data Pc) for the luminance value Xa of the pixel data Pa. Further, the second correction table 22a of the second correction circuit 22 stores the correction data of a correction curve (e.g., tone curve T2 illustrated in FIG. 3A), which is used to obtain the luminance value Xc of an output pixel (pixel data Pc), for the luminance value Xa of the pixel data Pa.

The first correction circuit 21 obtains pixel data Pb1 by correcting a luminance value of the pixel data Pa using the first correction table 21a. In the same manner, the second correction circuit 22 obtains pixel data Pb2 by correcting the luminance value of the pixel data Pa using the second correction table 22a. The mixing circuit 23 generates pixel data Pc using the luminance values of the pixel data Pb1 and Pb2. The luminance value of the pixel data output from each of the correction circuits 21 and 22 is one example of the correction value.

When switching from tone correction that uses the first tone curve T1 to tone correction that uses the second tone curve T2, the mixing control circuit 26 outputs a blend ratio to the mixing circuit 23. The mixing circuit 23 provides the output pixel Pc by mixing the first correction pixel Pb1 from the first correction circuit 21 and the second correction pixel Pb2 from the second correction circuit 22 at the blend ratio from the mixing control circuit 26. In this case also, when switching from tone correction that uses the first tone curve T1 to tone correction that uses the second tone curve T2, the luminance of the frame images is changed in a stepped manner so that the viewer may view high quality image that are continuous.

In the first embodiment, the blend ratio may be changed to, for example, "1:3" or "2:5".

In the embodiments described above, the operations of the tone control circuit may be controlled in accordance with the operation mode. For example, the electronic device (image processor) includes the tone control circuit 20 in the first embodiment and the tone control circuit 20a in the second embodiment. In this case, the CPU 10 may switch between the tone control circuits 20 and 20a in accordance with the operation mode.

In the embodiments described above, some of the processing performed by a tone control circuit may be performed by the CPU 10. For example, in the first embodiment, the CPU 10 detects switching of the frame image by using, for example, a vertical synchronization signal and provides the mixing circuit 23 with the control signal for setting a blend ratio. In this case, the mixing control circuit 26 and the frame counter 25 may be omitted so that the CPU 10 may change the blend ratio at any timing (whenever a certain number of frame images are processed). Further, the CPU 10 may output an α-value to the mixing circuit 23b.

In the second embodiment, the CPU 10 may perform the functions of at least some of the first characteristic value calculation circuit 31, the second characteristic value calculation circuit 32, the characteristic value difference calculation circuit 33, and the stage number calculation circuit 34. For example, the CPU 10 may calculate characteristic values of the correction tables 21a and 22a. Accordingly, it is possible to easily change values (range, total sum, gradient, maximum value, and the like of luminance values) which are used as the characteristic value.

In the embodiments described above, after termination of the stepped tone correction, an output value of either one of the first and second correction circuits 21 and 22, that is, either one of the first correction coefficient value K1 and the second correction coefficient value K2, is selected so that tone correction is performed on frame images using the selected correction coefficient value. In contrast, after the termination of the stepped tone correction, the tone correction may be performed on the frame images by using the third correction coefficient value K3 obtained by mixing the first correction coefficient value K1 and the second correction coefficient value K2. For example, tone correction may be performed on the eighth frame image F8 in FIG. 6A by using the third correction coefficient value K3 acquired by mixing the first correction coefficient value K1 and the second correction coefficient value K2 at a blend ratio of, for example, 1:9. The blend ratio is set with the setting screen by, for example, the mixing control circuit 26 or the CPU 10. This obtains consecutive frame images corrected to any luminance value.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to a showing of the superiority and inferiority of the invention. Although the embodiments of the invention have been described, it should be understood that the various changes, substitutions, and alterations could be made hereto without departing from the spirit and scope of the invention.

The invention claimed is:

1. An image processor comprising:
a first correction circuit that outputs a first correction value, which corresponds to a pixel value of an input image, based on a first correction characteristic;
a second correction circuit that outputs a second correction value, which corresponds to the pixel value of the input image, based on a second correction characteristic;
a control circuit that controls a ratio for mixing the first correction value and the second correction value, wherein the control circuit is configured to change the ratio in a plurality of stages and includes a table that stores the ratio at each of the stages and a number of frames of the input image in association with the ratio; and
a mixing circuit that mixes the first correction value and the second correction value based on the ratio, wherein the mixing circuit is configured to mix the first correction value and the second correction value at the same ratio for the input image corresponding to the number of frames, and wherein a corrected pixel value, which corresponds to the pixel value of the input image, is generated in accordance with an output value of the mixing circuit.

2. The image processor according to claim 1, further comprising a computation circuit that computes the corrected pixel value from the output value of the mixing circuit and the pixel value of the input image.

3. The image processor according to claim 1, wherein:
the table is one of a plurality of tables respectively corresponding to different transition stage numbers; and
the control circuit selects one of the plurality of tables and provides the mixing circuit with the ratio for the stage stored in the selected table.

4. The image processor according to claim 3, further comprising a calculation circuit that calculates the transition stage number based on a characteristic difference between the first correction characteristic and the second correction characteristic, wherein the control circuit selects one of the plurality of tables based on the transition stage number calculated by the calculation circuit.

5. The image processor according to claim 4, wherein the calculation circuit includes:
a first characteristic value calculation circuit that calculates a first characteristic value of the first correction characteristic;
a second characteristic value calculation circuit that calculates a second characteristic value of the second correction characteristic;
a characteristic value difference calculation circuit that calculates a difference between the first characteristic value and the second characteristic value; and
a stage number calculation circuit that calculates the transition stage number based on the difference calculated by the characteristic value difference calculation circuit.

6. The image processor according to claim 1, further comprising:
a first coefficient calculation circuit that outputs a first gain coefficient, which corresponds to the pixel value of the input image, based on a first gain characteristic;
a first multiplication circuit that multiplies the first correction value by the first gain coefficient;
a second coefficient calculation circuit that outputs a second gain coefficient, which corresponds to the pixel value of the input image, based on a second gain characteristic; and
a second multiplication circuit that multiplies the second correction value by the second gain coefficient, wherein the mixing circuit mixes the output value of the first multiplication circuit and the output value of the second multiplication circuit based on the ratio.

7. The image processor according to claim 1, further comprising an α-value calculation circuit that calculates an α-value, which corresponds to the pixel value of the input image, as the ratio, wherein the mixing circuit mixes the first correction value and the second correction value based on the α-value.

8. An electronic device comprising:
an image processor that corrects a pixel value of an input image and generates a corrected pixel value, wherein the image processor includes:
a first correction circuit that outputs a first correction value, which corresponds to the pixel value of the input image, based on a first correction characteristic;
a second correction circuit that outputs a second correction value, which corresponds to the pixel value of the input image, based on a second correction characteristic;
a control circuit that controls a ratio for mixing the first correction value and the second correction value, wherein the control circuit is configured to change the ratio in a plurality of stages and includes a table that stores the ratio at each of the stages and a number of frames of the input image in association with the ratio; and
a mixing circuit that mixes the first correction value and the second correction value based on the ratio, wherein the mixing circuit is configured to mix the first correction value and the second correction value at the same ratio for the input image corresponding to the number of frames.

9. A method for processing an image, the method comprising:
generating a first correction value, which corresponds to a pixel value of an input image, based on a first correction characteristic;
generating a second correction value, which corresponds to the pixel value of the input image, based on a second correction characteristic;
controlling a ratio for mixing the first correction value and the second correction value, wherein the controlling includes changing the ratio in a plurality of stages by reference to a table, the table storing the ratio at each of the stages and a number of frames of the input image in association with the ratio;
obtaining a mixed value of the first correction value and the second correction value based on the ratio, wherein the obtaining includes mixing the first correction value and the second correction value at the same ratio for the input image corresponding to the number of frames; and
generating a corrected pixel value, which corresponds to the pixel value of the input image, in accordance with the mixed value.

* * * * *